United States Patent
Tovkach et al.

(10) Patent No.: US 10,689,102 B2
(45) Date of Patent: *Jun. 23, 2020

(54) VERTICAL TAKE-OFF AND LANDING AIRCRAFT

(71) Applicant: OBSHCHESTVO S OGRANICHENNOJ OTVETSTVENNOSTYU "AVIANOVATSII", Novomoskovsk, Tulskaya oblast (RU)

(72) Inventors: Sergei Evgenievich Tovkach, Tulskaya oblast (RU); Aleksei Viktorovich Shanin, Minskaya oblast (BY); Igor Chudakov, San Jose, CA (US)

(73) Assignee: OBSHCHESTVO S OGRANICHENNOJ OTVETSTVENNOSTYU "AVIANOBATSII", Novomoskovsk (RU)

( * ) Notice: Subject to any disclaimer, the term of this patent is extended or adjusted under 35 U.S.C. 154(b) by 190 days.

This patent is subject to a terminal disclaimer.

(21) Appl. No.: 16/182,107

(22) Filed: Nov. 6, 2018

(65) Prior Publication Data
US 2019/0168866 A1 Jun. 6, 2019

Related U.S. Application Data

(63) Continuation of application No. PCT/RU2017/050053, filed on Jun. 23, 2017.

(30) Foreign Application Priority Data

Jul. 26, 2016 (RU) .................................. 2016130665

(51) Int. Cl.
*B64C 27/20* (2006.01)
*B64C 29/00* (2006.01)
(Continued)

(52) U.S. Cl.
CPC .............. *B64C 27/20* (2013.01); *B64C 27/08* (2013.01); *B64C 27/10* (2013.01); *B64C 27/50* (2013.01); *B64C 29/00* (2013.01); *B64D 27/22* (2013.01)

(58) Field of Classification Search
CPC ... B64C 27/08; B64C 29/0025; B64C 39/024; B64D 27/24; B64D 35/02
See application file for complete search history.

(56) References Cited

U.S. PATENT DOCUMENTS

| 6,886,776 B2 * | 5/2005 | Wagner .................... B64C 3/56 244/12.4 |
| 7,159,817 B2 * | 1/2007 | VanderMey ........ B64C 29/0016 244/12.1 |

(Continued)

FOREIGN PATENT DOCUMENTS

| RU | 2001836 C1 | 10/1993 |
| RU | 108016 U1 | 9/2011 |

(Continued)

OTHER PUBLICATIONS

International Search Report with regard to PCT/RU2017/050053 dated Oct. 26, 2017.

(Continued)

*Primary Examiner* — Justin M Benedik
(74) *Attorney, Agent, or Firm* — BCF LLP

(57) ABSTRACT

There is disclosed a multicopter vertical takeoff and landing (VTOL) aircraft. The aircraft comprises am airframe with spatial design, a pilot seat, a cockpit, controls, engine units, engine compartment, control system, remote control system. The airframe consists of a central section and, at least, two peripheral sections, wherein peripheral sections can be folded up or down, or be retracted under the central section. The central section and peripheral sections of the airframe have spatial design. Each of the peripheral sections com- (Continued)

prises at least three standard engine compartments which are connected to each other. Inside each engine compartment there is an engine unit which comprises at least one engine and at least one horizontally rotating propeller together with the control hardware. Each engine unit is an autonomous member of the distributed control system (DCS).

20 Claims, 20 Drawing Sheets

(51) Int. Cl.
  *B64C 27/08* (2006.01)
  *B64C 27/10* (2006.01)
  *B64C 27/50* (2006.01)
  *B64D 27/22* (2006.01)

(56) References Cited

U.S. PATENT DOCUMENTS

| | | | | |
|---|---|---|---|---|
| 8,393,564 B2* | 3/2013 | Kroo | ............... | B64C 3/56 244/6 |
| 8,505,846 B1* | 8/2013 | Sanders, II | ............... | B64C 29/02 244/7 A |
| 8,646,720 B2* | 2/2014 | Shaw | ............... | B64C 29/0025 244/17.23 |
| 2003/0062443 A1* | 4/2003 | Wagner | ............... | B64C 3/56 244/12.3 |
| 2006/0266881 A1* | 11/2006 | Hughey | ............... | B64C 27/08 244/17.23 |
| 2009/0008499 A1* | 1/2009 | Shaw | ............... | B64C 27/20 244/17.23 |
| 2011/0042509 A1* | 2/2011 | Bevirt | ............... | B64C 29/0033 244/12.4 |
| 2013/0020429 A1* | 1/2013 | Kroo | ............... | B64C 3/16 244/6 |
| 2013/0112804 A1* | 5/2013 | Zhu | ............... | B64C 29/0025 244/2 |
| 2013/0311008 A1 | 11/2013 | Kroo | | |
| 2014/0097290 A1* | 4/2014 | Leng | ............... | B64C 29/0025 244/6 |
| 2014/0339372 A1* | 11/2014 | Dekel | ............... | B64C 39/024 244/7 R |
| 2016/0023754 A1 | 1/2016 | Wiegand | | |

FOREIGN PATENT DOCUMENTS

| | | |
|---|---|---|
| WO | 2004065208 A2 | 8/2004 |
| WO | 2015/092389 A1 | 6/2015 |

OTHER PUBLICATIONS

English Abstract for RU108016 retrieved on Espacenet on Oct. 31, 2018.
English Abstract for RU2001836 (translation executed in Feb. 2018).
http://aerofex.com/theaerox/—pdf document, 1 page, Nov. 1, 2018.
http://www.hover-bike.com/MA/product/hoverbike-helicopter/—pdf document, 3 pages, Nov. 1, 2018.
http://www.moller.com/—pdf document, 13 pages, Nov. 1, 2018.
http://www.e-volo.com/—pdf document, 7 pages, Nov. 1, 2018.
International Search Report with regard to PCT/RU2016/000398 dated Nov. 17, 2016.
https://www.youtube.com/watch?v=Dd2f_2fgLoo&feature=youtu.be&t=35; "Eccentric Inventor Creates his own Flying Drone Car", accessed on Jun. 14, 2019, Screen Shot pdf 3 pages.
https://www.instagram.corn/p/Bul1h7lnqoj/?utm_source=ig_web_copy_link accessed on Jun. 14, 2019, Screen Shot pdf 8 pages.
https://www.instagram.com/p/BxSX2t1Hiis/?utm_source=ig_web_copy_link accessed on Jun. 14, 2019, Screen Shot pdf 2 pages.
https://www.trekaero.com/ accessed on Jun. 14, 2019, Screen Shot pdf 2 pages.

* cited by examiner

B-B (1 : 10)

C-C (1 : 10)

A-A (1 : 10)

D-D (1 : 10)

E-E (1 : 10)

F-F (1 : 10)

G-G (1 : 10)

VERTICAL TAKE-OFF AND LANDING AIRCRAFT

FIELD OF THE TECHNOLOGY

The present technology is related to aircraft engineering industry, in particular, to a vertical take-off and landing aircraft, such as a multicopter vertical take-off and landing (VTOL) aircraft.

BACKGROUND OF THE TECHNOLOGY

From the prior art there is known a 'flying hoverbike' (see patent RU 108016, 29 Oct. 2010) with a parachute recovery system, comprising a cruciform airframe, 4 symmetrically located propellers and an engine. The disadvantage of the said flying vehicle is that its airframe is a flat-type beam and it does not provide sufficient structural rigidity which is necessary for the whole structure to be resistant to precision oscillation and nutation oscillation generated by heavy propellers. This, in turn, causes resonance oscillation to appear and lead to fatigue defects of the airframe which makes the task of flight stabilization rather difficult. If at least one propeller out of four fails (and any other structural elements associated with the functioning of the propellers), it causes the flying vehicle to crash, its parachute recovery system is unable to prevent the accident and only mitigates the consequences. The efficiency of the parachute recovery system is doubtful for low flight altitudes. Heavy propellers of large diameter cannot be stopped quickly in emergency.

Additionally, from the prior art there is known a flying hoverbike designed by Aero-X Hoverbike comprising a combustion engine and two propellers for takeoff thrust, as well as a flight steering system with aerodynamic control surfaces. The disadvantage of the said flying vehicle is that both of its propellers are driven from the same engine, a double-propeller layout is not so reliable, any engine failure or any malfunction of propellers, transmission, aerodynamic control surfaces or other related systems will cause spinning of the flying vehicle during the flight making it impossible for the pilot to escape and for the flying vehicle to be rescued. Flat-type beam does not provide the structural rigidity necessary to withstand the precision and nutation oscillation generated by heavy propellers. This causes the resonance oscillation to appear, as well as fatigue defects in the airframe which makes the task of flight stabilization rather difficult. Heavy propellers of large diameter cannot be stopped quickly in emergency.

One more example from the prior art is a flying hoverbike designed by MA hoverbike helicopter available in various configurations—with two or four propellers. The disadvantage of the said flying vehicle is that both of its propellers are driven from the same engine, a double-propeller layout is not so reliable, any engine failure or any malfunction of propellers, transmission, aerodynamic control surfaces or other related systems will cause spinning of the flying vehicle during the flight making it impossible for the pilot to escape and for the flying vehicle to be rescued. The same is applicable for the 4-propeller embodiment, the flying machine cannot continue flying if just one propeller fails. Flat-type beam does not provide the structural rigidity necessary to withstand the precision and nutation oscillation generated by heavy propellers. This causes the resonance oscillation to appear, as well as fatigue defects in the airframe which makes the task of flight stabilization rather difficult. Heavy propellers of large diameter cannot be stopped quickly in emergency.

There is another flying vehicle called "Moller M200G Volantor" (US), comprising a platform, a fuselage, eight rotary piston engine (the Wankel engine), eight propellers installed circumferentially, a cockpit with a pilot seat. The disadvantage of the said vehicle is that it has a single fuel supply system and a fuel tank feeding all of the eight engines, so the failure of the fuel supply system would immediately cause all the engines to stop. Autorotation landing is not possible for this vehicle because of smaller impellers and low deceleration force of the engines, therefore, flight safety by means of engine redundancy is not ensured. The Wankel engines are known as rather complicated to control, because of higher acceleration time as compared with electric engines. It is also necessary to keep high engine rpm in order to maintain better engine performance. These engine features underlie the use of propeller pitch control system. This add-on makes the flying vehicle heavier and less reliable, it also means more maintenance due to one more serviceable unit installed on each of the engines. All those disadvantages of propulsion system cause the flying vehicle overswinging even in calm air (which is pretty well noticeable in the published videos where the tests of the flying vehicle are shown) which is likely to cause loss of hold during the flight and finally leads to the accident. Frequent overheating and engine fire were the reason why the flying vehicle designer changed the type of fuel: they replaced petrol with toxic ethanol-water mixture. This change did not help to overcome the fire hazard issue, but negatively affected the power-to-weight ratio and engine acceleration time. Among the disadvantages which prevented this invention to be launched into serial production were the following: low reliability, short service life and maintainability of the Wankel engines and propeller pitch control system, low producibility of the flying vehicle, clumsy design of the flying vehicle—bowl-shaped with high windage, lack of foldability features together with increased cost.

Another known example is a VC200 flying vehicle offered by e-volo, comprising 16 horizontally installed electric engines with propellers, a cockpit with a charging battery inside, and a parachute recovery system. Among the disadvantage of the most similar product are: interdependent power system with all the engines supplied by the same battery and with extensive power wiring between the battery and the engines which does not ensure the flight safety via redundancy, because failure of the battery causes all of the engines to stop at the same time, while small diameter of propellers and low engine deceleration force make the autorotation landing impossible. The fuselage design with fracture susceptible carbon members (with dia. over 10 meters) of the flat structural airframe where the propellers are installed make the flying vehicle heavier without solving any design task. The combination of the above disadvantages increases the cost of the flying vehicle and has negative impact on its maintainability. Aviation-type controls require the pilot to have the helicopter piloting skills. The efficiency of the parachute recovery system is doubtful for low flight altitudes.

SUMMARY OF THE INVENTION

Embodiments of the present technology aim to provide a small-sized, mobile, environmentally friendly and safe multicopter vertical takeoff and landing (VTOL) aircraft (herein below referred to as "aircraft") with high maintainability, failsafe, cost effective, space-saving both in operational and folded condition. Embodiments of the present technology can be used as a personal transportation vehicle, as a flying crane, airdrop platform, reconnaissance and attack means, heavy unmanned aircraft (UAV) or remotely-piloted aircraft (RPAV)

The technical effect of the non-limiting embodiments of the present technology may include increased fail-safety, maintainability and overall flight safety, space-saving both in operational and folded condition.

The technical effect of the non-limiting embodiments of the present technology is achieved by implementing at least some of the following features: airframe, folding mechanism, pilot seat, controls, engine units, control system, remote control system, wherein the airframe consists of a central section and at least two peripheral sections, wherein peripheral section consists of, at least, three interconnected standard engine compartments, wherein inside each engine compartment there is at least one engine and, at least, one horizontal propeller.

According to one embodiment of the non-limiting embodiments of the present technology the peripheral sections of the airframe consist of standard engine compartments which are fully or partially made of identical parts, wherein a part from one section can be installed onto any of the other sections.

According to one embodiment of the non-limiting embodiments of the present technology the engine compartment on the peripheral section of the airframe is limited with the aerodynamic shaft which generates the wind tube around the engine unit installed inside the engine compartment.

According to one embodiment of the non-limiting embodiments of the present technology the engine compartments of the airframe have in-line arrangement, symmetrically to each other and located at least in the same horizontal plane.

According to one embodiment of the non-limiting embodiments of the present technology the engine compartments of the airframe are arranged in a chess-board order, displaced to each other and located at least in the same horizontal plane.

According to one embodiment of the non-limiting embodiments of the present technology the engine compartments of the airframe are displaced in respect to one another in the same vertical plane.

According to one embodiment of the non-limiting embodiments of the present technology each engine unit comprises, at least, one electric engine, power supply of which is implemented from, at least, one power supply source located directly on the engine unit within the airstream produced by the engine impeller.

According to one embodiment of the non-limiting embodiments of the present technology the engine unit comprises, at least, two electric engines arranged in-line.

According to one embodiment of the non-limiting embodiments of the present technology the power supply sources of the aircraft is configured to be switched to supply power to the other engines by a wired system of switches.

According to one embodiment of the non-limiting embodiments of the present technology the electric power supply source is designed as a set of fuel cells, radioisotope and nuclear sources of electric power.

According to one embodiment of the non-limiting embodiments of the present technology each of the engine units with an electric engine is an autonomous unit with independent power supply source, instrumentation, engine control appliances, battery charging and control appliances, autopilot board. All the units are integrated within the same networks inside the aircraft and operate independently, but enable overall functioning as one whole system of the flying vehicle.

According to one embodiment of the non-limiting embodiments of the present technology each engine unit comprises one pneumatic engine, wherein each pneumatic engine of each engine unit is powered from the compressor installed in the central section of the airframe via individual piping with valve system and electric drive regulating flow of the compressed gas supplied to the engines and the engine thrust following the commands from the distributed control system of the flying vehicle.

According to one embodiment of the non-limiting embodiments of the present technology the engine unit comprises, at least, two pneumatic engines arranged in-line.

According to one embodiment of the non-limiting embodiments of the present technology the compressed air piping are located either inside or outside the airframe members.

According to one embodiment of the non-limiting embodiments of the present technology the compressor additionally comprises a pneumatic accumulator.

According to one embodiment of the non-limiting embodiments of the present technology each pneumatic engine unit is an autonomous unit with a separate channel of pneumatic energy transfer from the central compressor and its own instrumentation operated with the commands received from the distributed control system.

According to one embodiment of the non-limiting embodiments of the present technology there is a redundant compressor and redundant piping with autonomously operated valves inside, wherein the redundant compressor is installed inside the central section of the airframe, next to the main one.

According to one embodiment of the non-limiting embodiments of the present technology there is a pilot seat in the central section of the airframe, and all controls, sticks and pedals, a rudder, together with all compressor controls are also installed there.

According to one embodiment of the non-limiting embodiments of the present technology there is a streamlined cockpit covering a pilot seat in the central section of the airframe.

According to one embodiment of the non-limiting embodiments of the present technology the standard controls are configured to be disassembled (removed) with a quick coupler, if necessary, and to use them as a remote control unit to operate the aircraft in unmanned mode.

According to one embodiment of the non-limiting embodiments of the present technology each engine unit is controlled autonomously, wherein each peripheral section has equal number of engine units with propellers rotating clockwise, and equal number of engine units with contra-rotating propellers.

According to one embodiment of the non-limiting embodiments of the present technology each of the engine units is controlled autonomously, wherein each peripheral section has engine units with the even number of contra-rotating propellers.

According to one embodiment of the non-limiting embodiments of the present technology the aircraft has some automated systems which ensure that the following flight parameters remain without changes: altitude, flight path, flight route, spatial position.

According to one embodiment of the non-limiting embodiments of the present technology each aircraft comprises an automatic control system which can operate either in manned or unmanned mode, or remotely.

According to one embodiment of the non-limiting embodiments of the present technology there is a suspension gear located in the center of gravity and used for lifting and transportation of cargoes with an external hanger device.

According to one embodiment of the non-limiting embodiments of the present technology the peripheral sections are configured to be furnished with rear and front view scanners, ancillary devices and lighting devices.

According to one embodiment of the non-limiting embodiments of the present technology the peripheral section can be folded upwards, downwards or be retracted under the aircraft.

As such, in accordance with the first broad aspect of the present technology, there is provided a multicopter vertical takeoff and landing (VTOL) aircraft. The VTOL aircraft comprises: an airframe implemented with a spatial design, a pilot seat, controls, a cockpit, a distributed control system, a remote control system, the airframe including a central section and at least two peripheral sections, the central section and the at least two peripheral sections being implemented with the spatial design, each peripheral section includes at least three interconnected standard engine compartments, each engine compartment housing an engine unit, the engine unit including at least one engine and at least one horizontally rotatable propeller together with the control hardware.

In some implementations of the VTOL aircraft, the at least two peripheral sections comprise standard modules, each standard module being constructed of a plurality of parts, with at least some of the plurality of parts being interchangeable between any two different standard modules.

In some implementations of the VTOL aircraft, the at least two peripheral sections are configured to be at least one of: folded upwards, folded downwards or be retracted under the VTOL aircraft when stored.

In some implementations of the VTOL aircraft, the at least two peripheral sections are located in a space limited by structural elements of the airframe, without encompassing any of the structural elements of the airframe inside, the peripheral section including: at least two fastening points where the at least one engine unit is attached to the airframe, and wherein two neighboring sections have, at least, one fastening point in common between them.

In some implementations of the VTOL aircraft, engine compartments with engine units have an in-line arrangement, symmetrical to each other and are located in a single horizontal plane.

In some implementations of the VTOL aircraft, sections of the engine compartment are arranged in a chess-board order, displaced to each other and located in a single horizontal plane.

In some implementations of the VTOL aircraft, the at least one electric engine being supplied with power, in use, from at least one power supply source located directly on the engine unit located within an airstream produced by the at least one horizontally rotatable propeller.

In some implementations of the VTOL aircraft, the engine unit comprises, at least, two coaxially located electric engines.

In some implementations of the VTOL aircraft, the at least one power supply source of a given engine unit is configured to be selectively switched to supply power to another engine unit via a wired system of switches.

In some implementations of the VTOL aircraft, the at least one power supply source comprises at least one of: a set of fuel cells, radioisotope and nuclear sources of electric power.

In some implementations of the VTOL aircraft, each of the engine units is implemented as an autonomous unit having: an electric engine, an independent power supply source, an instrumentation set, engine control appliances, battery charging and control appliances, an autonomous autopilot module, the autonomous unit being integrated with other autonomous units as part of the VTOL aircraft functioning as one whole system of the flying vehicle.

In some implementations of the VTOL aircraft, each engine unit comprises at least one pneumatic engine, wherein power supply of each one of the at least one pneumatic engine is supplied from the compressor installed in the central section of the airframe via individual piping with a valve system with electric drives, regulating the flow of the compressed gas supplied to the at least one pneumatic engines and their thrust in response to commands from the distributed control system.

In some implementations of the VTOL aircraft, the at least one pneumatic engine comprises at least two coaxially arranged pneumatic engines.

In some implementations of the VTOL aircraft, the individual pipings are located either inside or outside the airframe.

In some implementations of the VTOL aircraft, each pneumatic engine unit is an autonomous unit with a separate channel of pneumatic energy transfer from the compressor and an instrumentation set operated in response to commands received from the distributed control system.

In some implementations of the VTOL aircraft, the VTOL aircraft further comprises a redundant compressor and redundant pipings with autonomously operated valves, wherein the redundant compressor is installed inside the central section of the airframe.

In some implementations of the VTOL aircraft, the central section comprises: the cockpit with the pilot seat and controls, control system, hand- and foot-operated controls, steering block and a compressor.

In some implementations of the VTOL aircraft, the remote control unit comprises standard controls configured to be selectively disassembled, in order to use the standard control for remote control VTOL aircraft of the VTOL aircraft in an unmanned mode.

In some implementations of the VTOL aircraft, each peripheral section comprises a plurality of engine units that are autonomously controllable, each peripheral section being implemented with an equal number of engine units having propellers rotating clockwise and engine units having propellers rotating counterclockwise.

In some implementations of the VTOL aircraft, each engine unit is controlled autonomously, wherein each peripheral section has an even number of engine units having contra rotating propellers.

BRIEF DESCRIPTION OF THE DRAWINGS

Features, details, as well as advantages of this aircraft follow from the below description of embodiments of the claimed multicopter vertical take-off and landing (VTOL) aircraft using the following drawings which represent:

Figure 1:
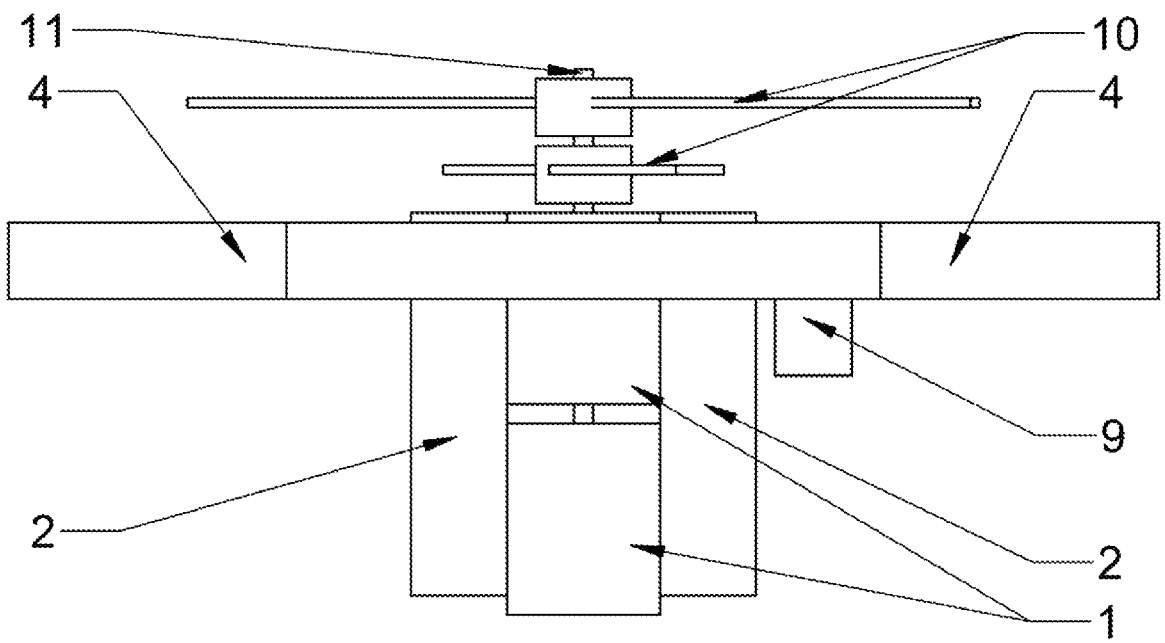
FIG. 1 depicts a side view of an engine unit with electric engines and two contra-rotating propellers, all implemented in accordance to non-limiting embodiments of the present technology.
Figure 2:
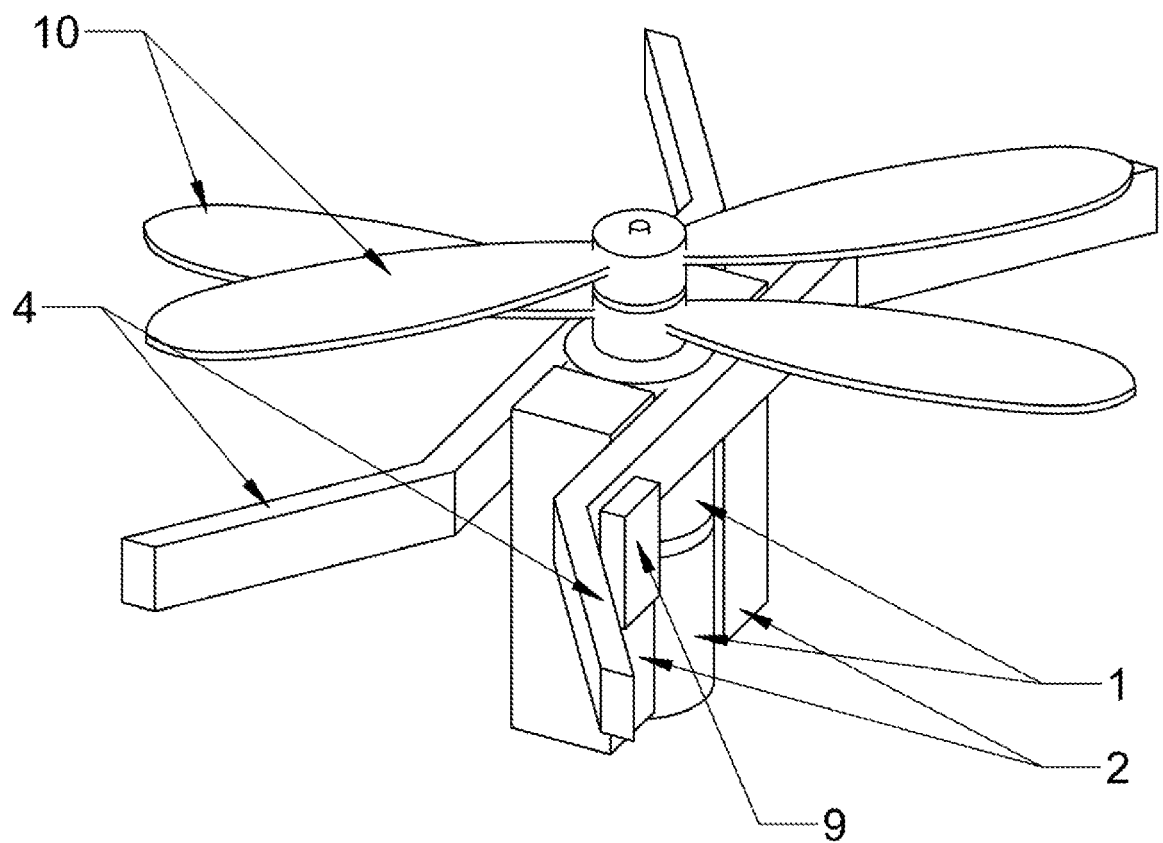
FIG. 2 depicts a general view of the engine unit with electric engines and two contra-rotating propellers, all implemented in accordance to non-limiting embodiments of the present technology.
Figure 3:
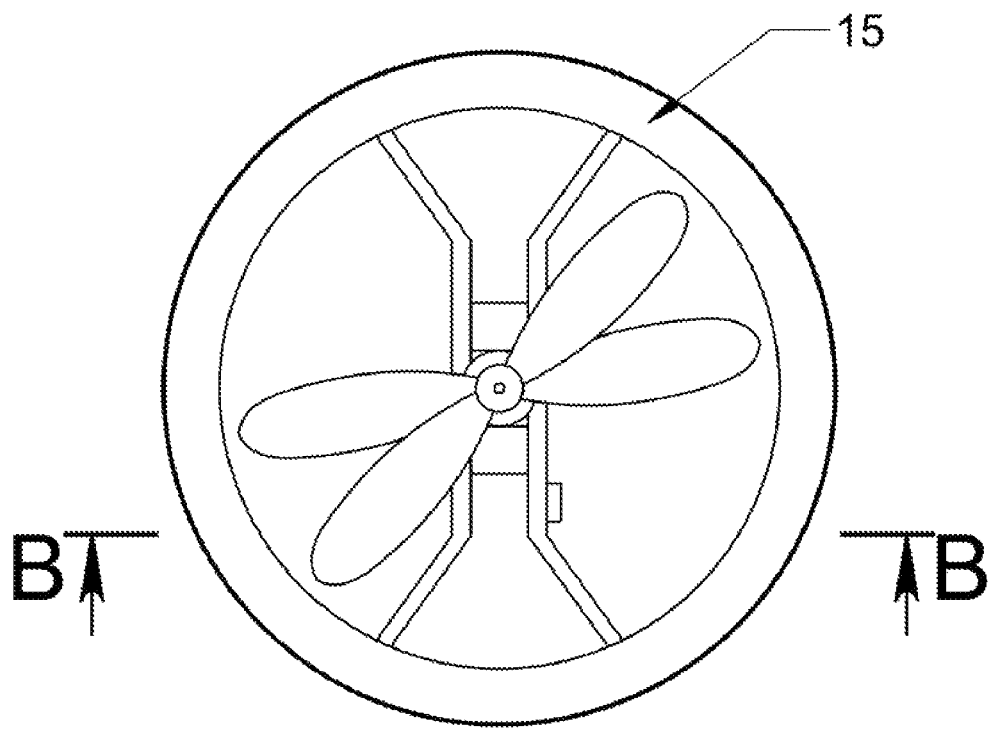
FIG. 3 depicts a top view of the engine units with electric engines and two contra-rotating propellers, located inside the aerodynamic shaft, and sectional view to the shaft, B-axis, all implemented in accordance to non-limiting embodiments of the present technology.
Figure 3:
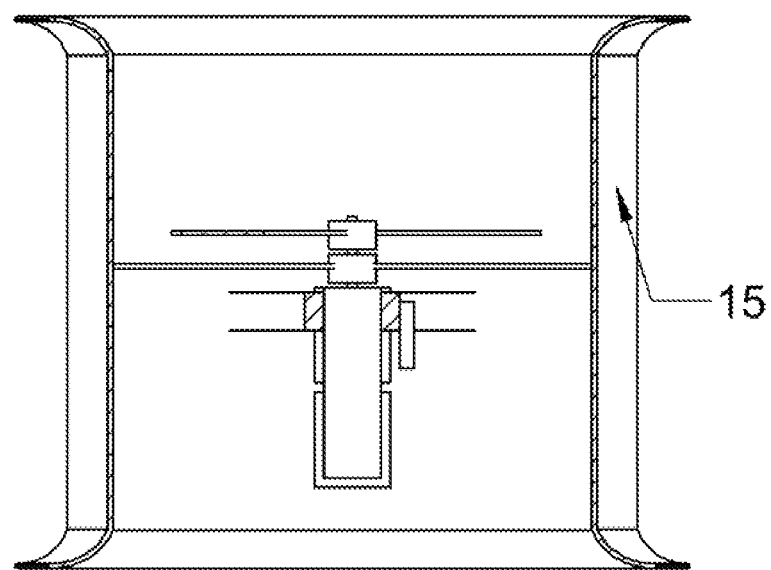
Figure 4:
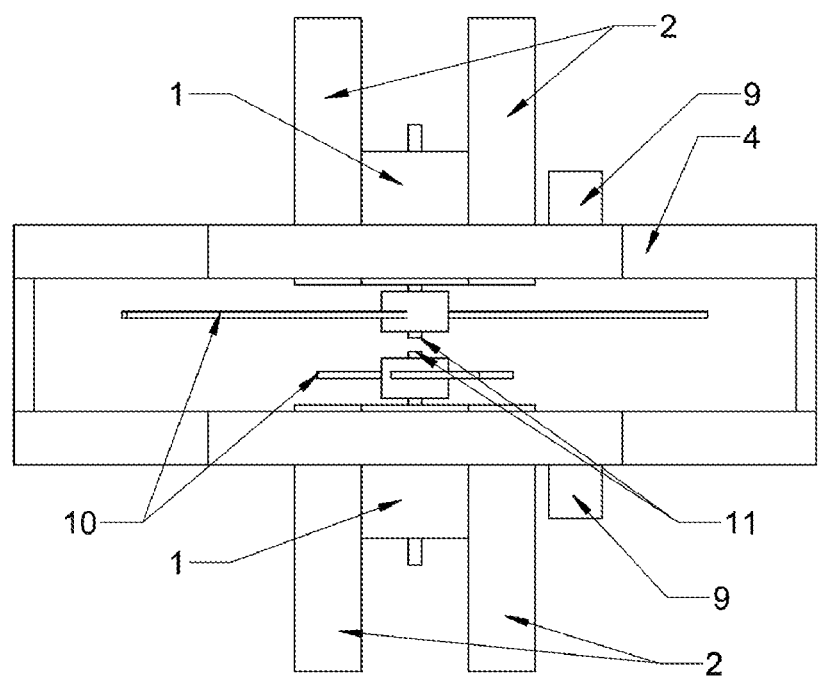
FIG. 4 depicts a side view of the engine unit with electric engines and two contra-rotating propellers, each driven individually, all implemented in accordance to non-limiting embodiments of the present technology.
Figure 5:
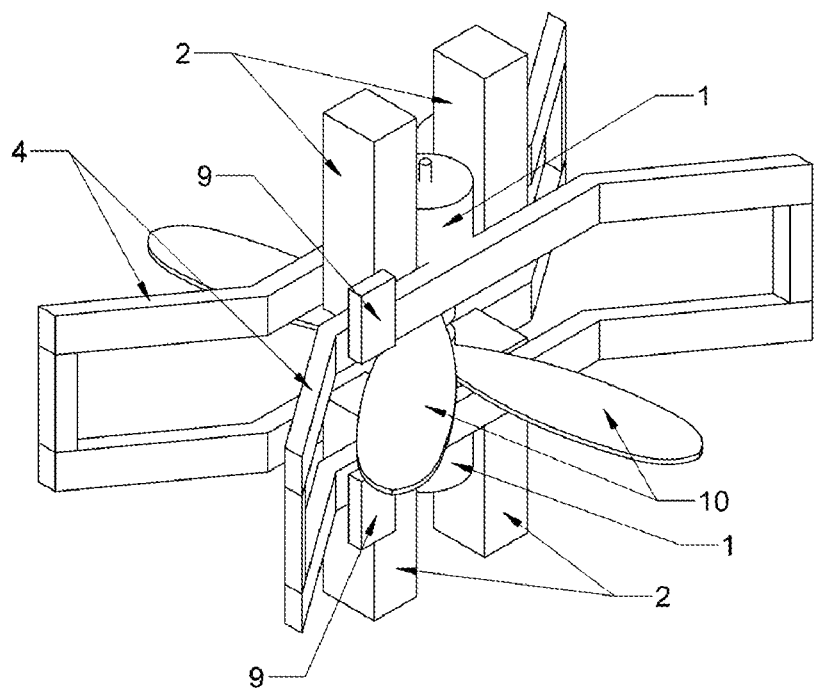
FIG. 5 depicts a general view of the engine unit with electric engines and two contra-rotating propellers, each driven individually, all implemented in accordance to non-limiting embodiments of the present technology.
Figure 6:
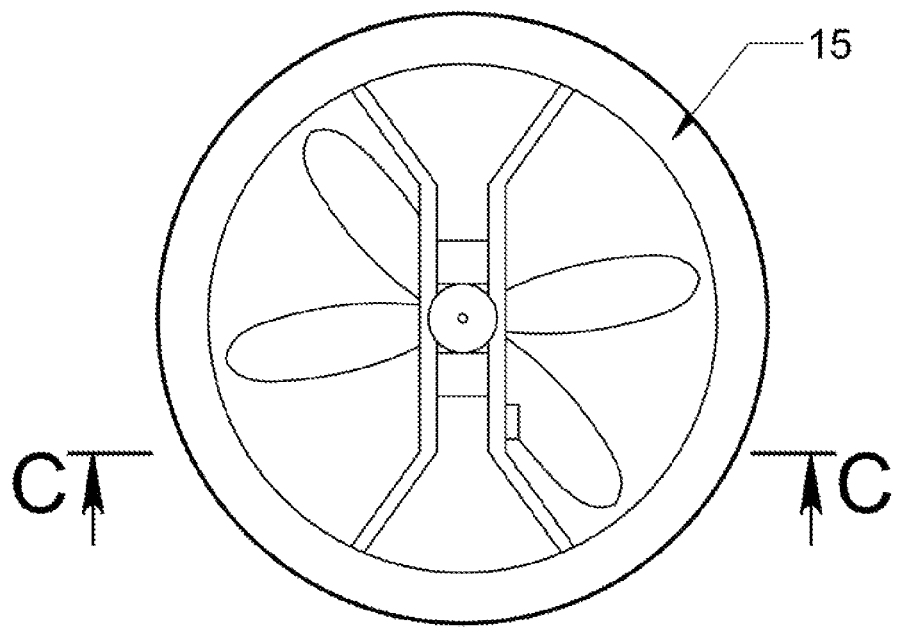
FIG. 6 depicts a top view of the engine units with electric engines and two contra-rotating propellers, located inside the aerodynamic shaft, and sectional view to the shaft, C-axis, all implemented in accordance to non-limiting embodiments of the present technology.
Figure 6:
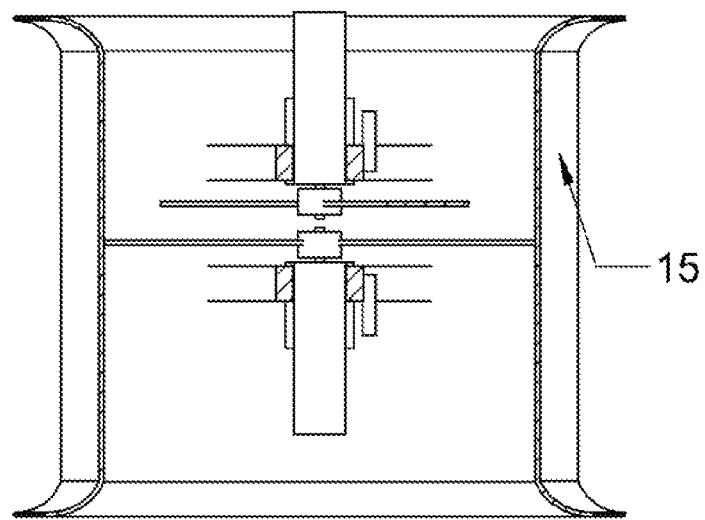
Figure 7:
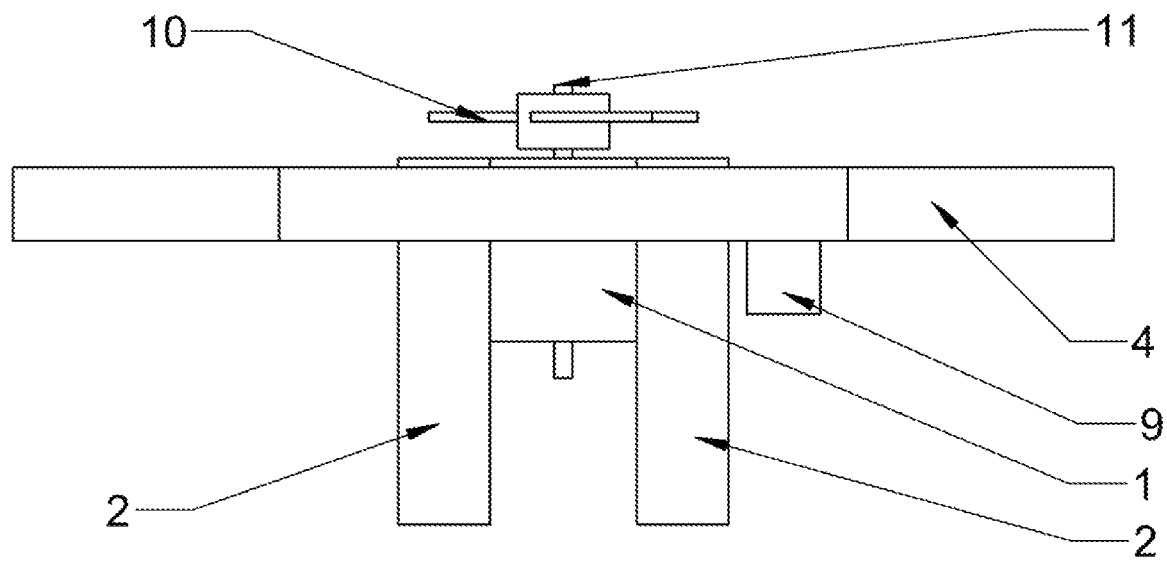
FIG. 7 depicts a side view of the engine unit with electric engines and one propeller, all implemented in accordance to non-limiting embodiments of the present technology.
Figure 8:
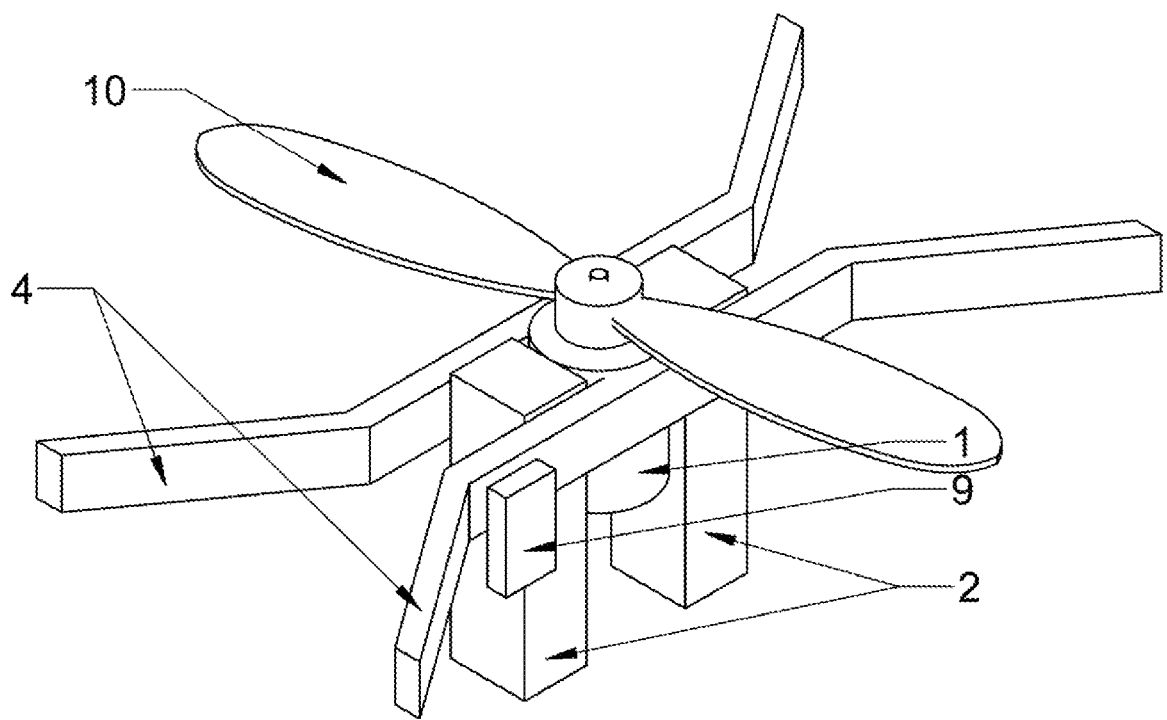
FIG. 8 depicts a general view of the engine unit with electric engines and one propeller, all implemented in accordance to non-limiting embodiments of the present technology.
Figure 9:
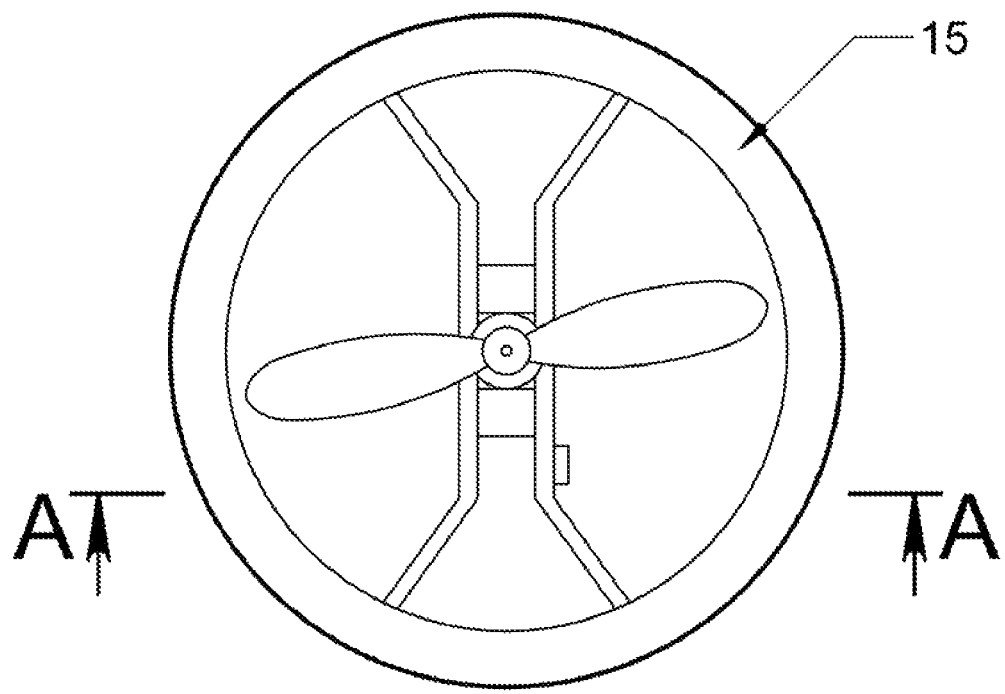
FIG. 9 depicts a top view of the engine units with electric engines and one propeller, located inside the aerodynamic shaft, and sectional view to the shaft, A-axis, all implemented in accordance to non-limiting embodiments of the present technology.
Figure 9:
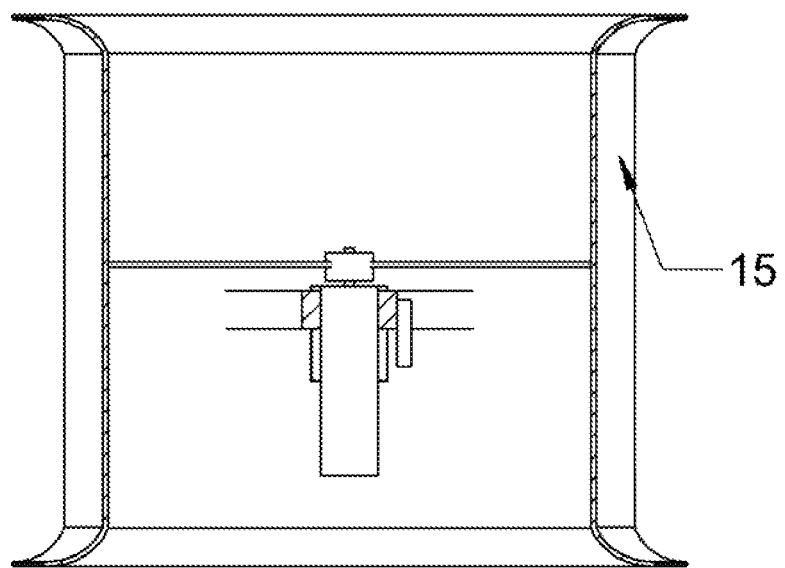
Figure 10:
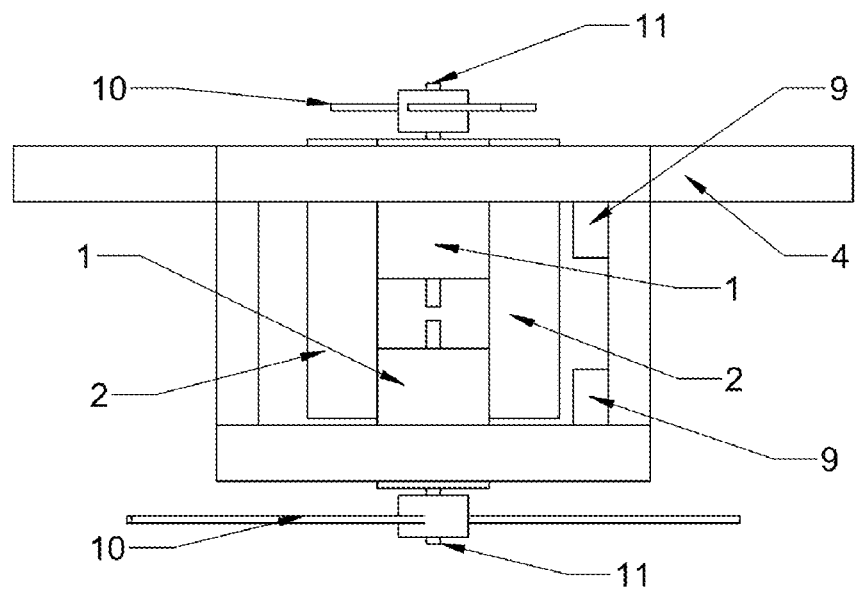
FIG. 10 depicts a side view of the engine unit with electric engines and two contra-rotating propellers, each driven individually, all implemented in accordance to other non-limiting embodiments of the present technology.
Figure 11:
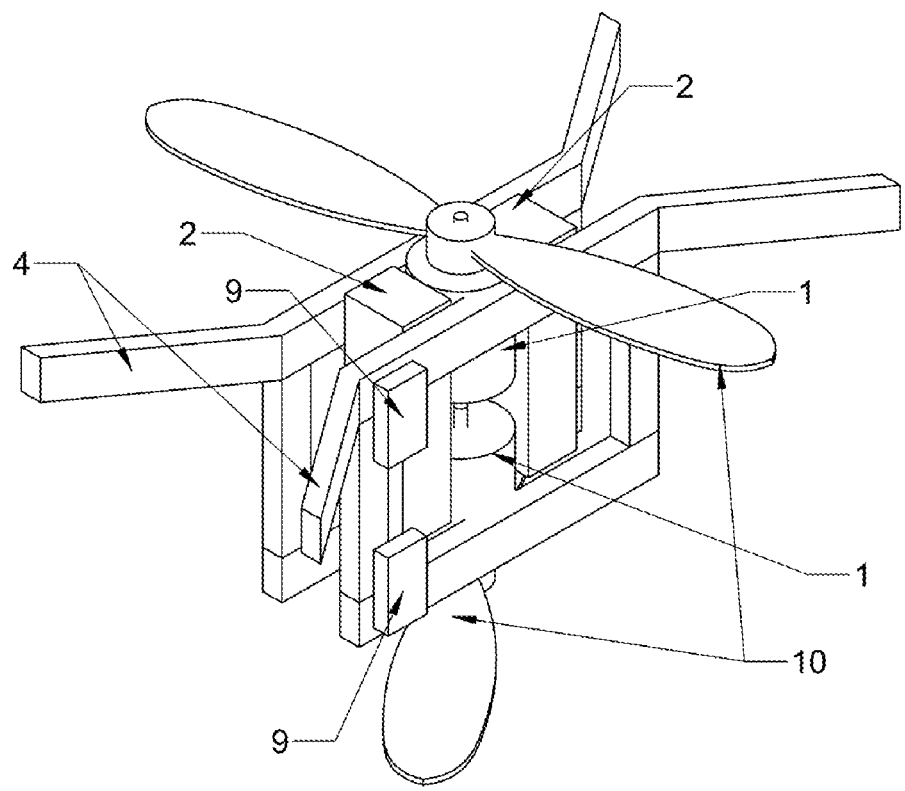
FIG. 11 depicts a general view of the engine unit with electric engines and two contra-rotating propellers, each driven individually, all implemented in accordance to other non-limiting embodiments of the present technology.
Figure 12:
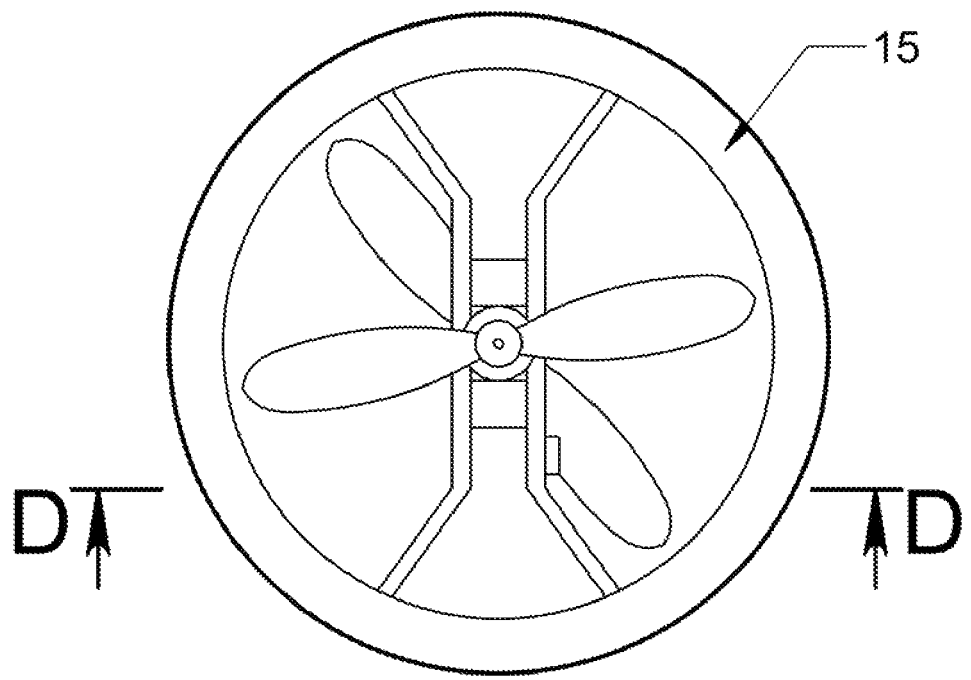
FIG. 12 depicts a top view of the engine unit with electric engines and two contra-rotating propellers (driven each individually), located inside the aerodynamic shaft, and sectional view to the shaft, D-axis, all implemented in accordance to non-limiting embodiments of the present technology.
Figure 12:
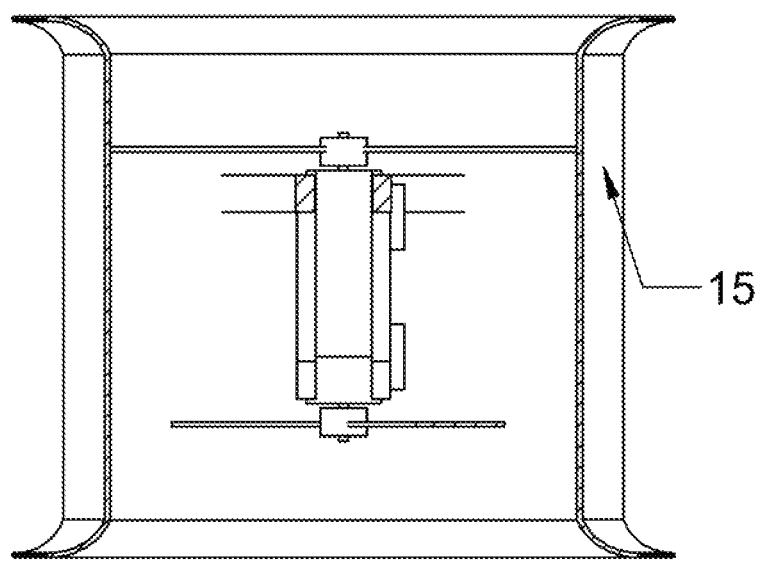
Figure 13:
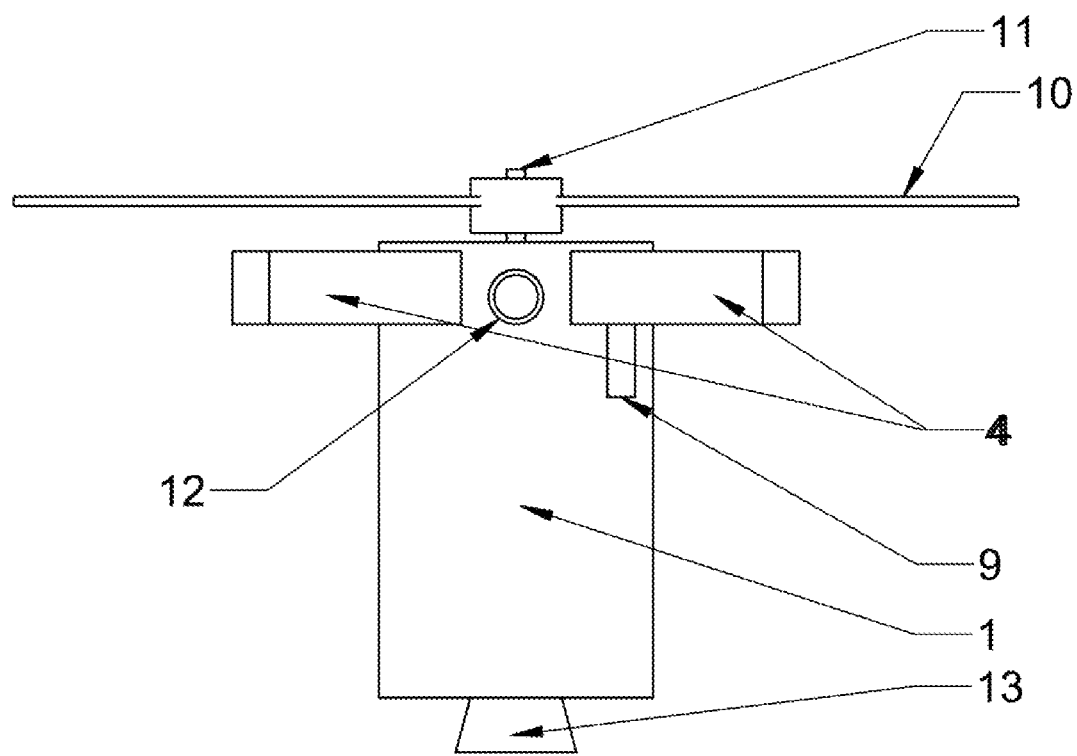
FIG. 13 depicts a side view of the engine unit with pneumatic engines and one propeller, all implemented in accordance to non-limiting embodiments of the present technology.
Figure 14:
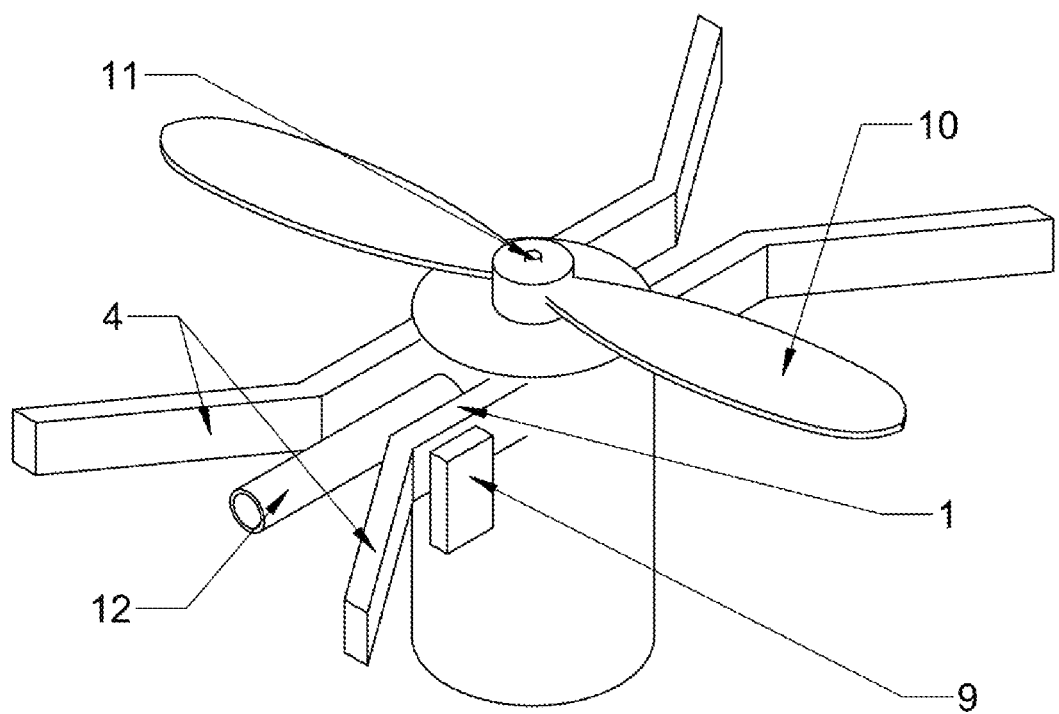
FIG. 14 depicts a general view of the engine unit with pneumatic engines and one propeller, all implemented in accordance to non-limiting embodiments of the present technology.
Figure 15:
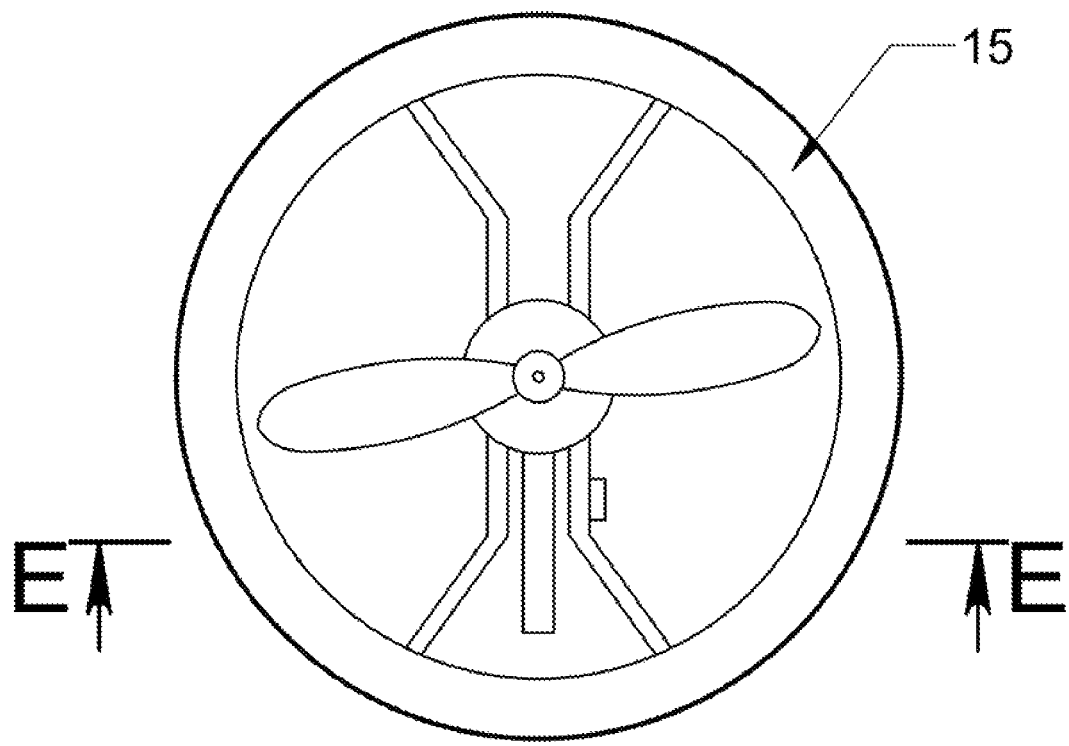
FIG. 15 depicts a top view of the engine units with pneumatic engines and one propeller, located inside the aerodynamic shaft, and sectional view to the shaft, E-axis, all implemented in accordance to non-limiting embodiments of the present technology.
Figure 15:
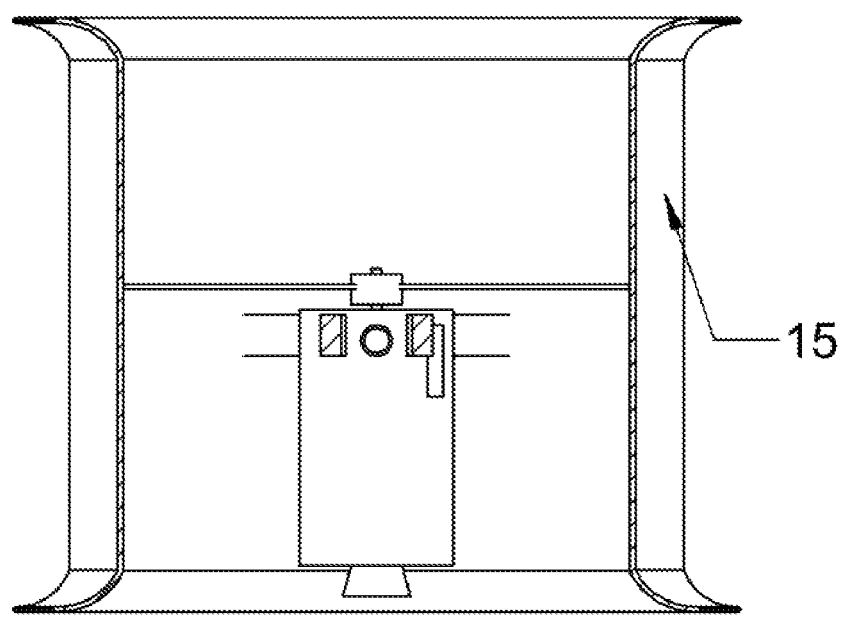
Figure 16:
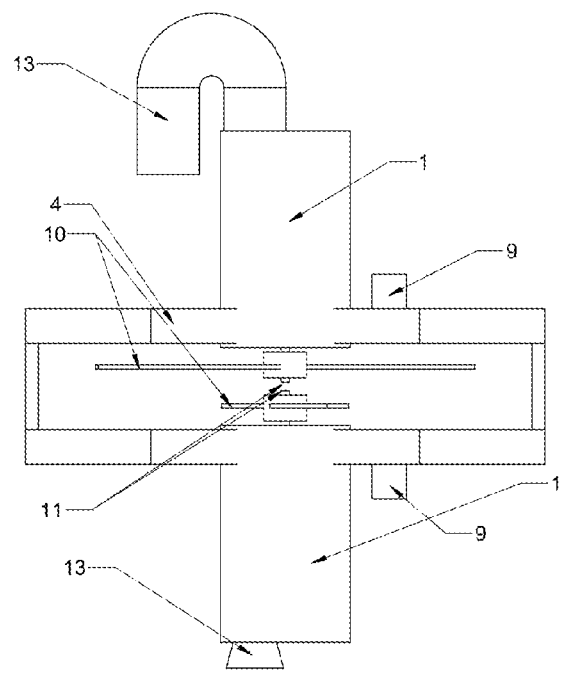
FIG. 16 depicts a side view of the engine unit with pneumatic engines and two contra-rotating propellers, each driven individually, all implemented in accordance to non-limiting embodiments of the present technology.
Figure 17:
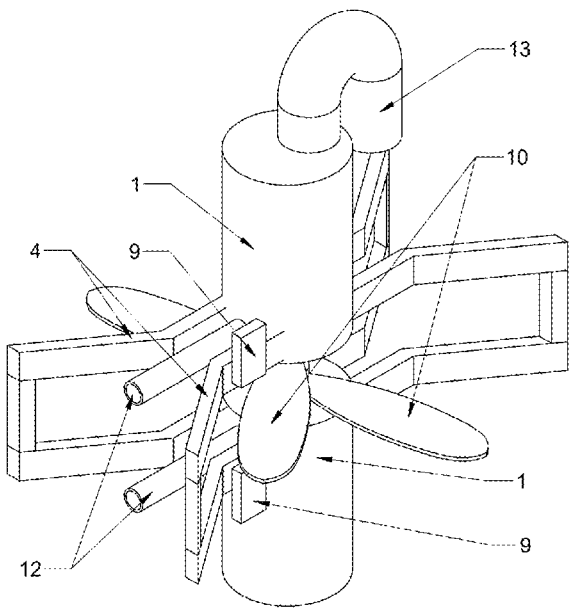
FIG. 17 depicts a side view of the engine unit with pneumatic engines and two contra-rotating propellers, each driven individually, all implemented in accordance to non-limiting embodiments of the present technology.
Figure 18:
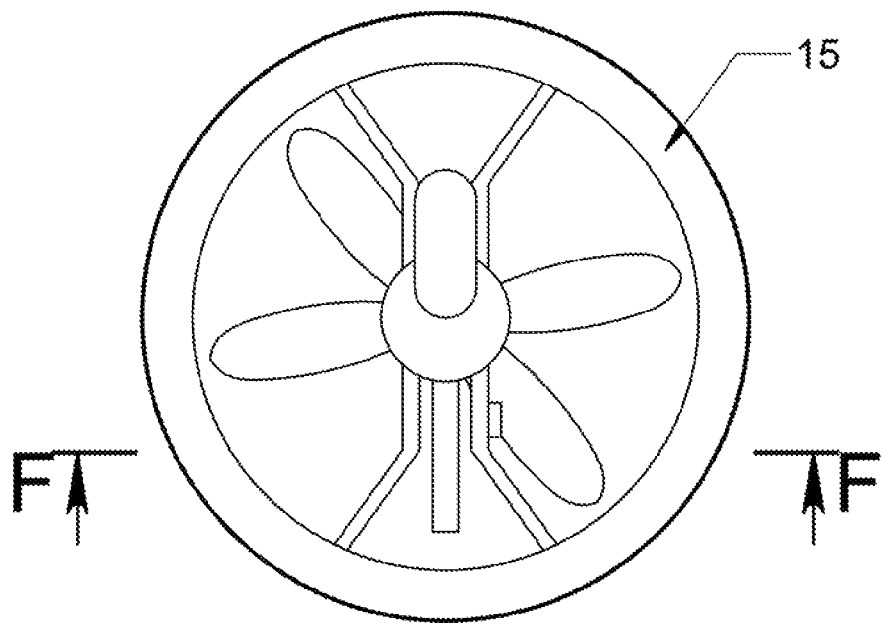
FIG. 18 depicts a top view of the engine unit with pneumatic engines and two contra-rotating propellers (driven each individually), located inside the aerodynamic shaft, and sectional view to the shaft, F-axis, all implemented in accordance to non-limiting embodiments of the present technology.
Figure 18:
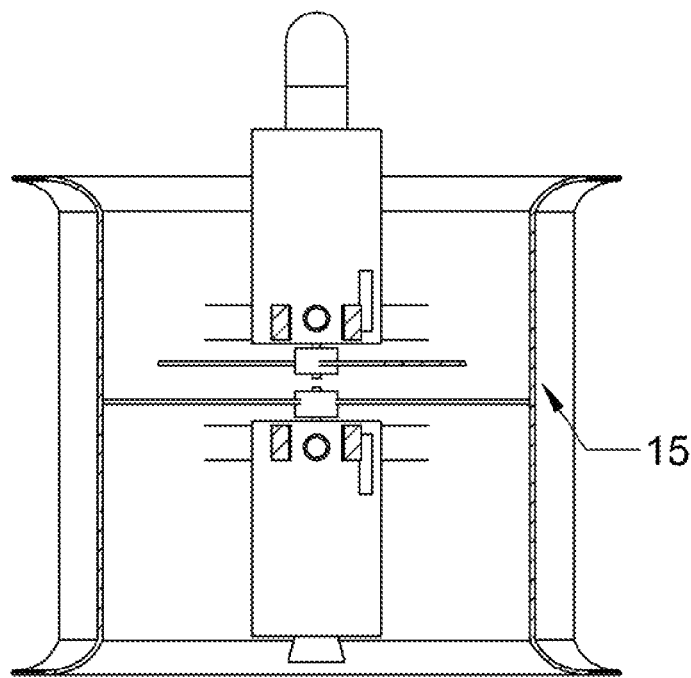
Figure 19:
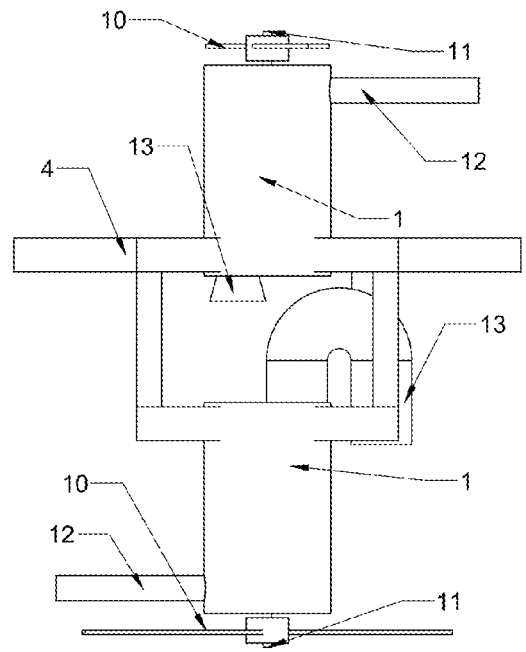
FIG. 19 depicts a side view of the engine unit with pneumatic engines and two contra-rotating propellers, each driven individually, all implemented in accordance to other non-limiting embodiments of the present technology.
Figure 20:
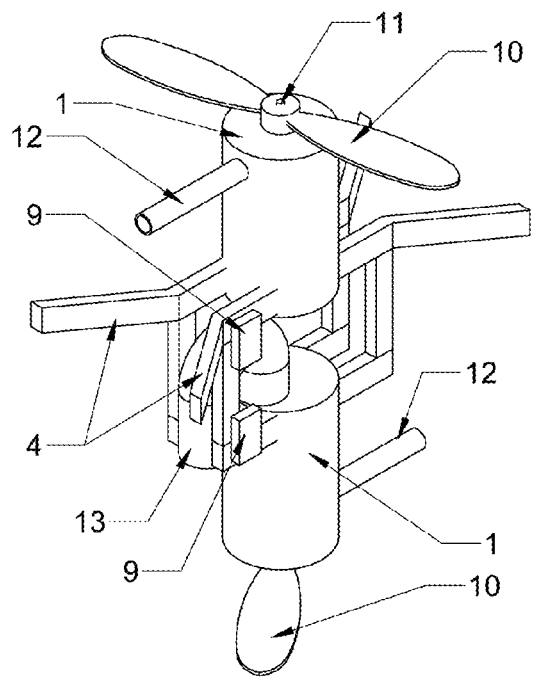
FIG. 20 depicts a general view of the engine unit with pneumatic engines and two contra-rotating propellers, each driven individually, all implemented in accordance to other non-limiting embodiments of the present technology.
Figure 21:
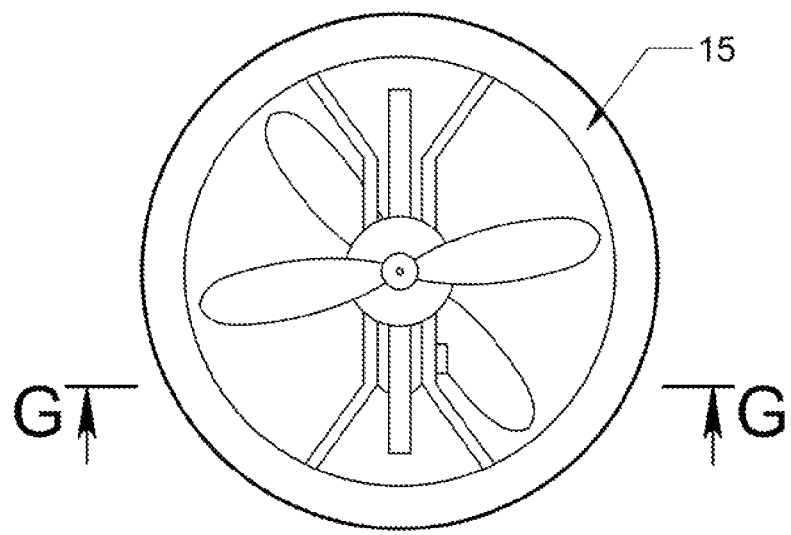
FIG. 21 depicts a top view of the engine unit with pneumatic engines and two contra-rotating propellers (driven each individually), located inside the aerodynamic shaft, and sectional view to the shaft, G-axis, all implemented in accordance to non-limiting embodiments of the present technology.
Figure 21:
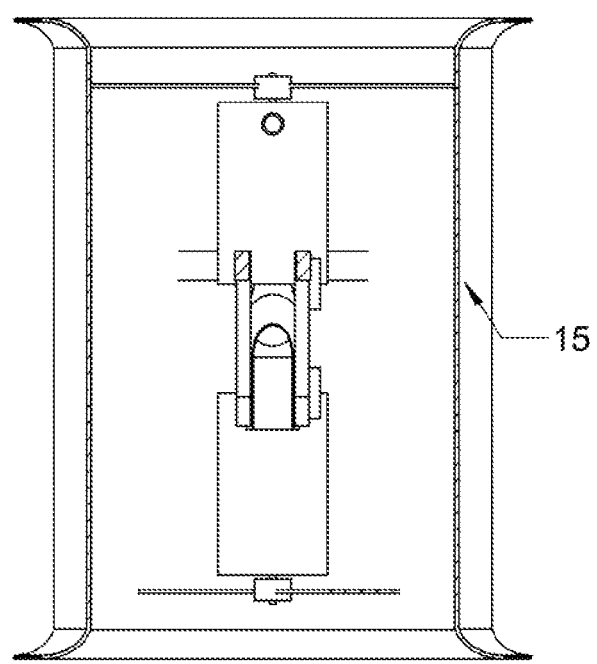
Figure 22:
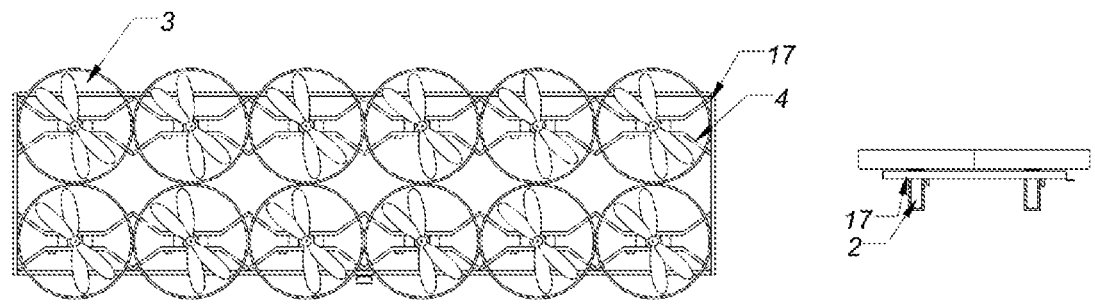
FIG. 22 depicts an in-line arrangement of the engine units on the airframe, all implemented in accordance to non-limiting embodiments of the present technology.
Figure 23:
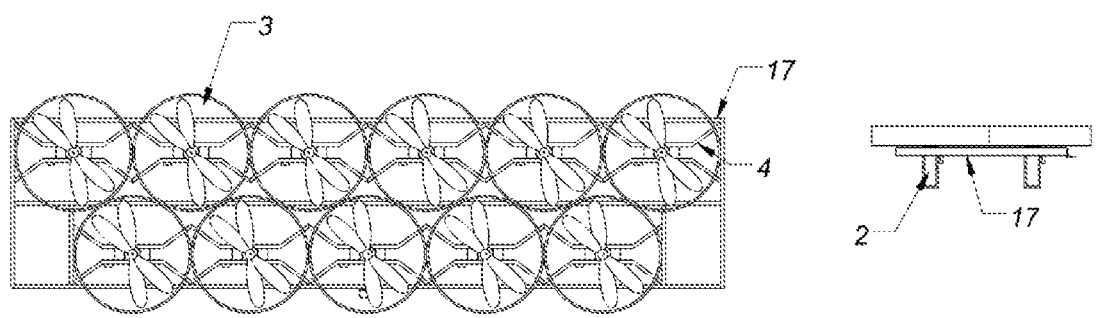
FIG. 23 depicts a chess-order arrangement of the engine units on the airframe, all implemented in accordance to non-limiting embodiments of the present technology.

In the Figures, the reference numerals are generally referring to:

1—engine, 2—electric power source (for an embodiment of the electrically driven unit), 3—engine unit installed on the airframe, 4—support structures for the engine unit, 5—folding mechanism, 6—pilot seat, 7—steering system, 8—compressor (for pneumatically driven units), 9—control hardware (including engine controller, autopilot board, battery charging and control systems, and other units and systems with necessary functionality; 10—propeller, 11—propeller drive shaft, 12—inlet pipe for compressed gas, 13—outlet pipe for exhaust gas, 14—control pedals, 15—aerodynamic shaft of the engine unit, 16—quick coupler latches of the steering column; 17—airframe, 18—controls on the rudder; 19—control block of the steering column with a radio transmitter and a battery; 20—control unit with ultrasonic range sensor, 21—cockpit door, 22—cockpit, 23—LH part of the airframe, 24—RH part of the airframe, 25—central part of the airframe, 26—external suspension device, 27—forward and rear view radars, 28—lighting fixtures, 29—arrangement of standby power sources, 30—lock of the airframe folding mechanism (preferable embodiment), 31—lock pin, 32—spline, 33—hinge of the airframe folding mechanism (preferable embodiment), 34—airframe of the engine sections, 35—rpm sensor, 36—vibration sensor, 37—electric current sensor, 38—voltage sensors, 39—temperature sensors.

DETAILED DESCRIPTION OF THE NON-LIMITING EMBODIMENTS OF THE PRESENT TECHNOLOGY

The claimed multicopter vertical takeoff and landing (VTOL) aircraft (herein below referred to as "aircraft") aircraft design comprises two sections, each of which includes, at least, three engine compartments, each of the engine compartments further housing an engine unit (3) includes, at least, one engine, electrically or pneumatically driven, and, at least, one horizontally rotatable propeller (10), wherein the engines are independent of each other in terms of their electrical and mechanical hardware, they are also individually controlled via onboard distributed information network, wherein the propellers rotate clockwise and counterclockwise, in equal extent (if there are more than one propeller).

Each engine unit (3) comprises an individual power supply source (2) or uses a separate power transfer channel, together with all necessary engine control and monitoring hardware, autopilot board, data transmission systems. Failure of one or more engine units (3) does not cause the flipping or spinning of the aircraft because the loss of thrust and torque automatically gets compensated by the non-faulty engine units (3) if their reserve power is sufficient, wherein the non-faulty engine units (3) are totally independent of the faulty ones. Similarly, the failure of autopilot board and other electronic systems (9) on a particular engine unit will not cause the failure of the whole control system of the aircraft, because the faulty unit is provided with the redundant units. Decision whether a particular unit is faulty or not, is made by the remaining units within an onboard information network, automatically on the basis of arbitration approach. The data generated by the unit which has been recognized faulty (master type unit) is ignored by onboard information network. For the slave type unit, the following scenarios are applied: isolation, bypass, or substitution with the non-faulty units. The decentralized control and the distributed architecture make this aircraft fail-safe and serviceable, which technical advantage can be realized in at least some of the non-limiting embodiments of the present technology.

Additional recovery systems, either for the pilot or for the whole aircraft, are not required, as the resilience is ensured for the whole range of flight altitudes. Small and light-weighted (as compared with the helicopter) propellers (10) can be stopped immediately in emergency to ensure the aircraft's operational safety. To stop the propellers, either engine braking or reverse engine thrust is applied.

An aircraft safety system is represented, first, with a group of optical sensors located directly near the propellers (10). As soon as any object is noticed in the vicinity of propellers, the sensors generate signals which cause the emergency stop of the propeller (10). If the aircraft is operated in heavy dust conditions, the optical sensors can be replaced with capacitance or radiolocation sensors, wherein the latter ones provide broader coverage, and capacitance sensors ensure better selectivity. Secondly, the safety system includes a group of optical sensors located inside the hollow components of the airframe. These sensors include receivers and transmitters of optical signals operating continuously during the flight. In case any airframe component is damaged or broken, the optical communication channel gets damaged too and a distributed control system receives a signal about the location of the damaged area on the airframe.

The airframe of the aircraft has spatial design and is able to ensure necessary rigidity combined with the smaller weight of the aircraft. High maintainability is achieved with the modular structure of the airframe, based on a lot of similar elements which are produced of standard construction profiles: round-shaped, rectangular or oval, of which airframe sections consists, wherein the engine units are installed, and with few moving parts and wear parts, as well as servicing points, such as bearings, bushings, transmissions, hinge joints of swashplate, etc.

Depending on the configuration the aircraft can be electrically or pneumatically driven to ensure better operational cost effectiveness.

The multicopter vertical takeoff and landing (VTOL) aircraft consists of an airframe (17), a control system (20), hand-operated controls (18), a cockpit (22) with a pilot seat, engine units (3) integrated within the airframe sections, and ancillary systems.

The aircraft airframe (17) has spatial design with a central section (25) and side sections (also called peripheral sections in the description presented herein)—RH section (24) and LH section (23) in relation to the flight direction. In the present description the spatial design refers to a "truss" based structure. Wherein the central section of the airframe has a spatial design and is used for installation of the controls, the cockpit (22) and the pilot seat, the control system (20), the hand-operated (18) and the foot-operated controls, a removable steering block (19) to be used also as a remote control unit, compressor (8) (for pneumatic embodiment) and its systems. The shape of the central section depends on the ergonomic parameters of the pilot seat taking into consideration the pilot's weight, height and the quantity of equipment.

The LH (24) and RH (23) airframe sections (in relation to the flight direction) are sections of the engine units and used for arrangement of engine units, a main and a redundant power supply sources, piping and wiring, forward and rear view sensors, ancillary devices, such as head lights, bumpers, etc. These airframe sections are spatial structures and implemented as standard modules connected to each other, inside which there are standard-type engine units which, together with the airframe, comprise LH and RH section of the engine units, wherein only one engine unit (3) is installed inside each of the sections.

A section is a part of the airframe located in the space limited by structural elements of the airframe, such as longerons, spacer bars, beams, skin, etc., without encompassing any of the structural elements of the airframe inside, and having, at least, two fastening points where the at least one engine unit is attached to the airframe, and wherein two neighboring sections have, at least, one fastening point in common between them.

Wherein the neighboring sections are fully or partially made of identical parts (elements) to enable the parts to be exchanged between the sections for maintainability. This approach to design provides flexibility in creating aircrafts with varying lifting capacity, as the number of sections (and engine units, respectively) can be increased as an extension to the existing airframe (section).

Figure 24:
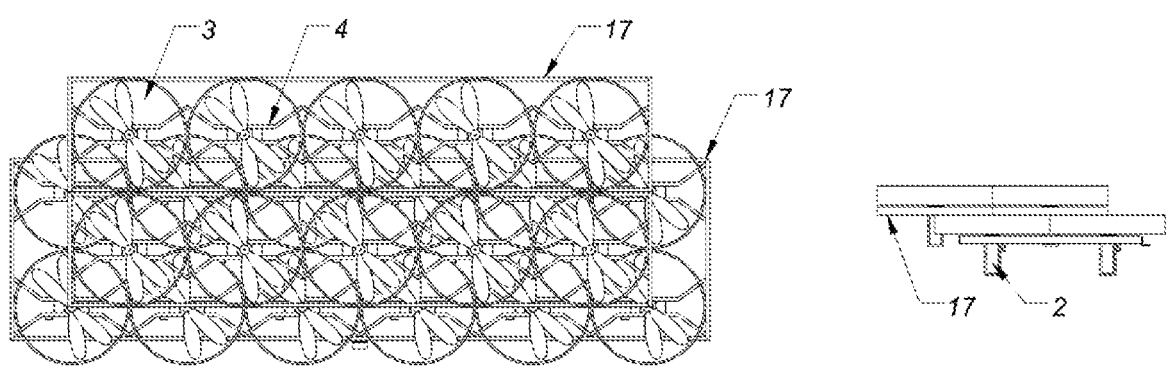
FIG. 24 depicts a chess-order and dual-plane arrangement of engine units on the airframe, all implemented in accordance to non-limiting embodiments of the present technology.
Figure 25:
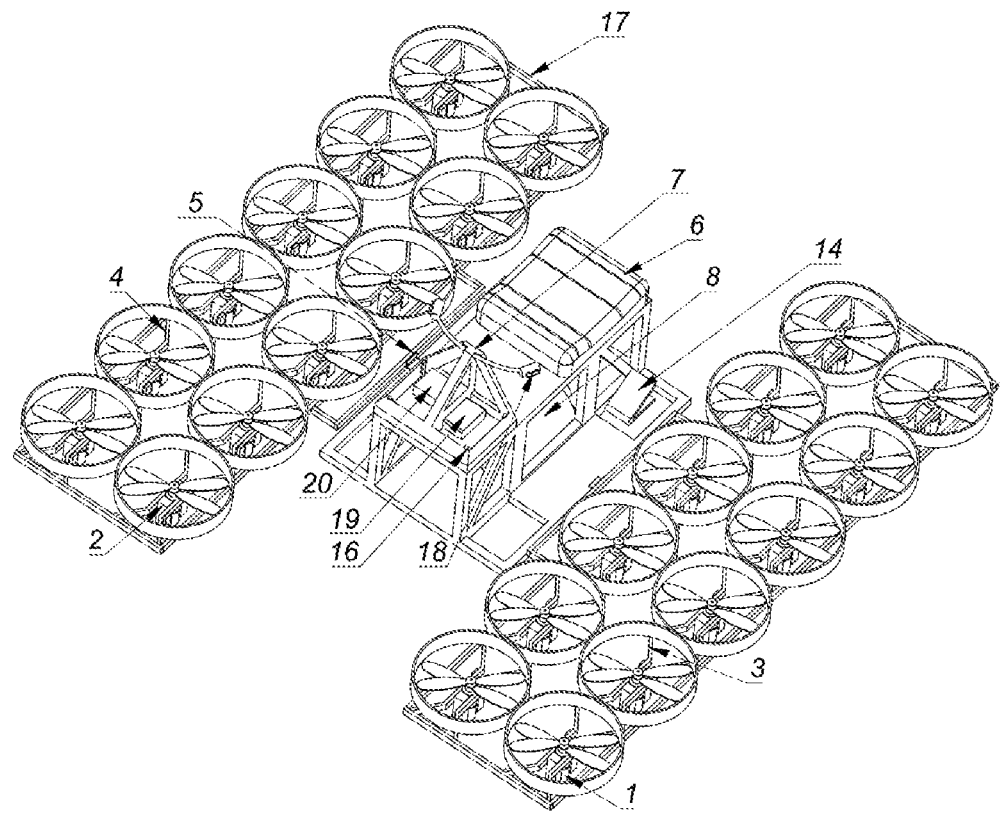
FIG. 25 depicts an airframe extended with two sections (without a cockpit), all implemented in accordance to non-limiting embodiments of the present technology.
Figure 26:
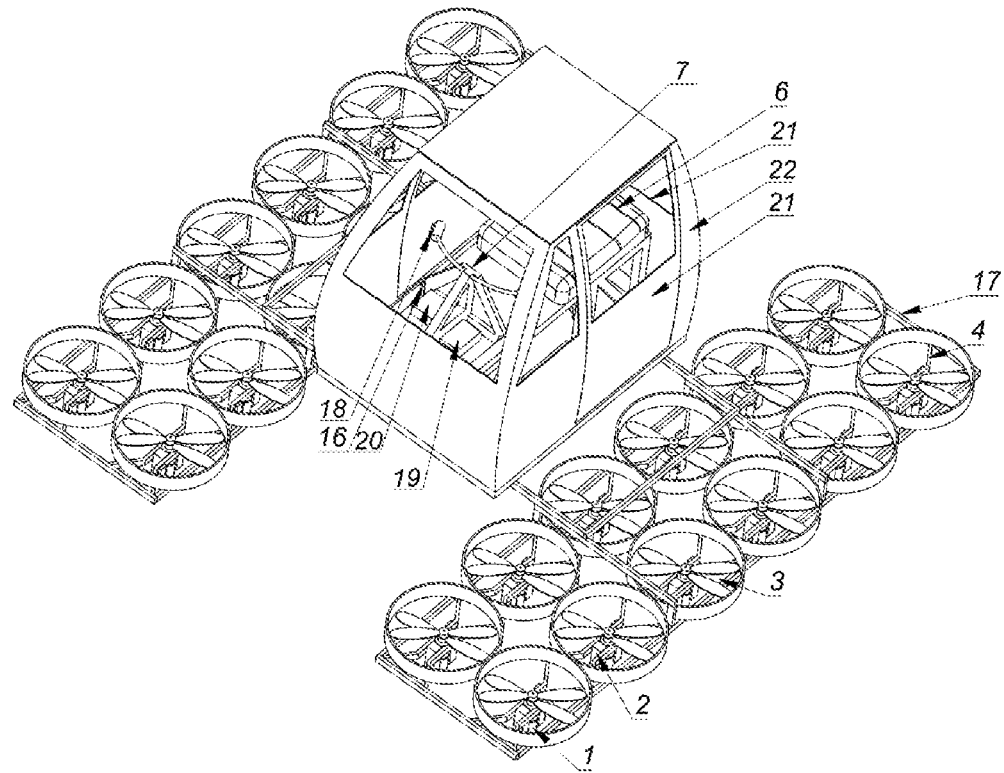
FIG. 26 depicts an airframe extended with two sections (with a cockpit), all implemented in accordance to non-limiting embodiments of the present technology.
Figure 27:
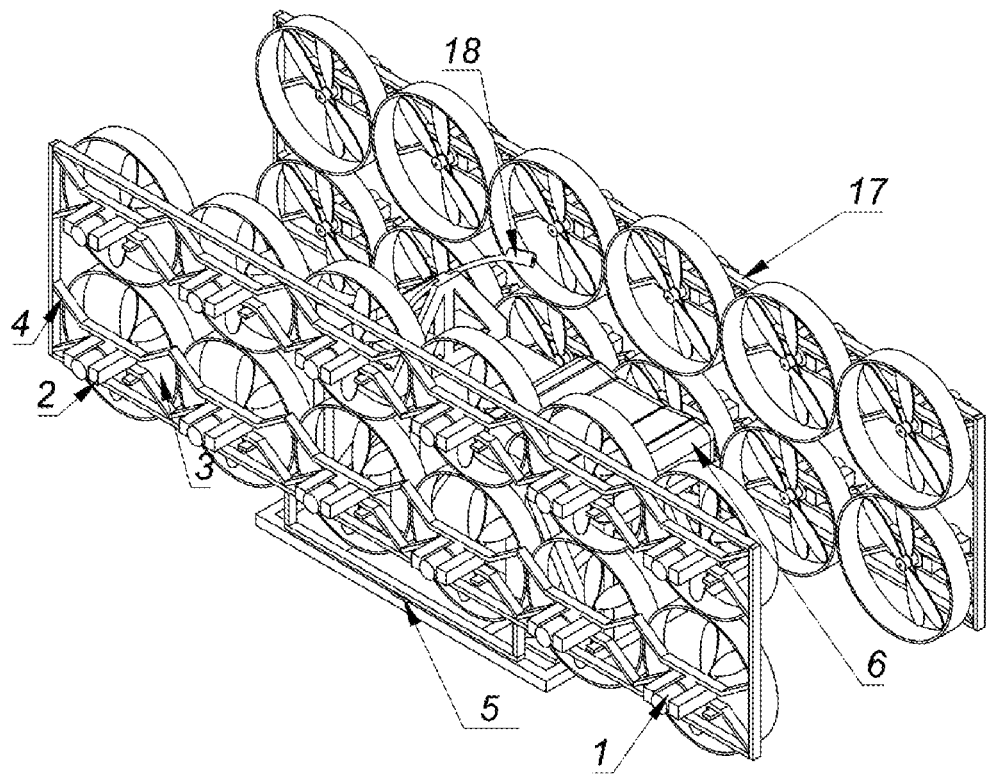
FIG. 27 depicts an airframe with two sections folded up, all implemented in accordance to non-limiting embodiments of the present technology.
Figure 28:
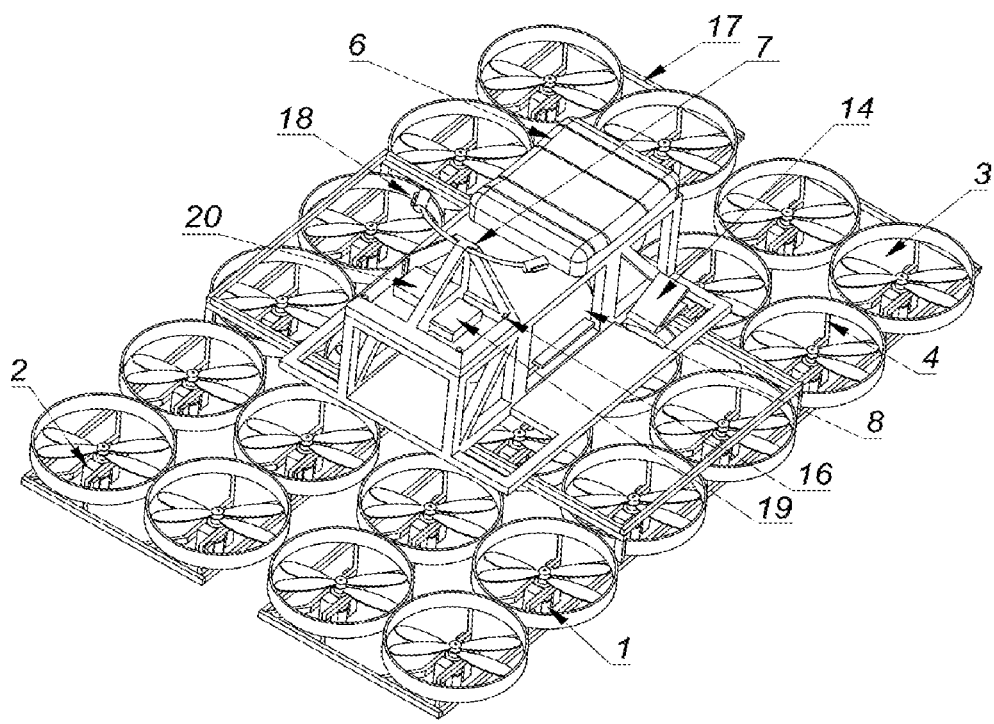
FIG. 28 depicts an airframe with two folding sections to be pushed under the central section of the airframe, all implemented in accordance to non-limiting embodiments of the present technology.
Figure 29:
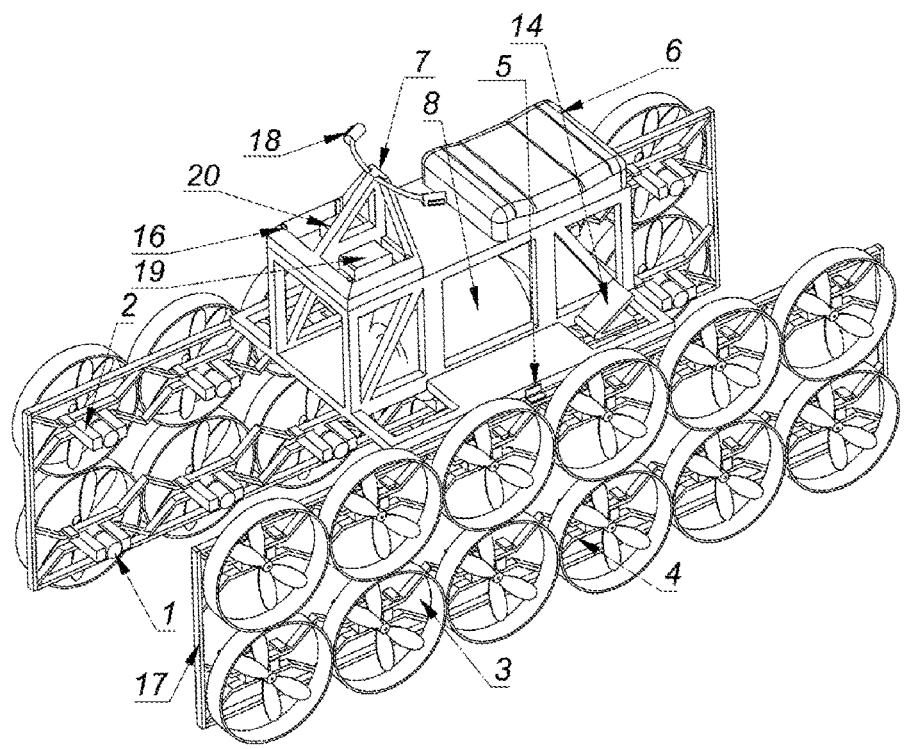
FIG. 29 depicts an airframe with two sections folded down, all implemented in accordance to non-limiting embodiments of the present technology.
Figure 30:
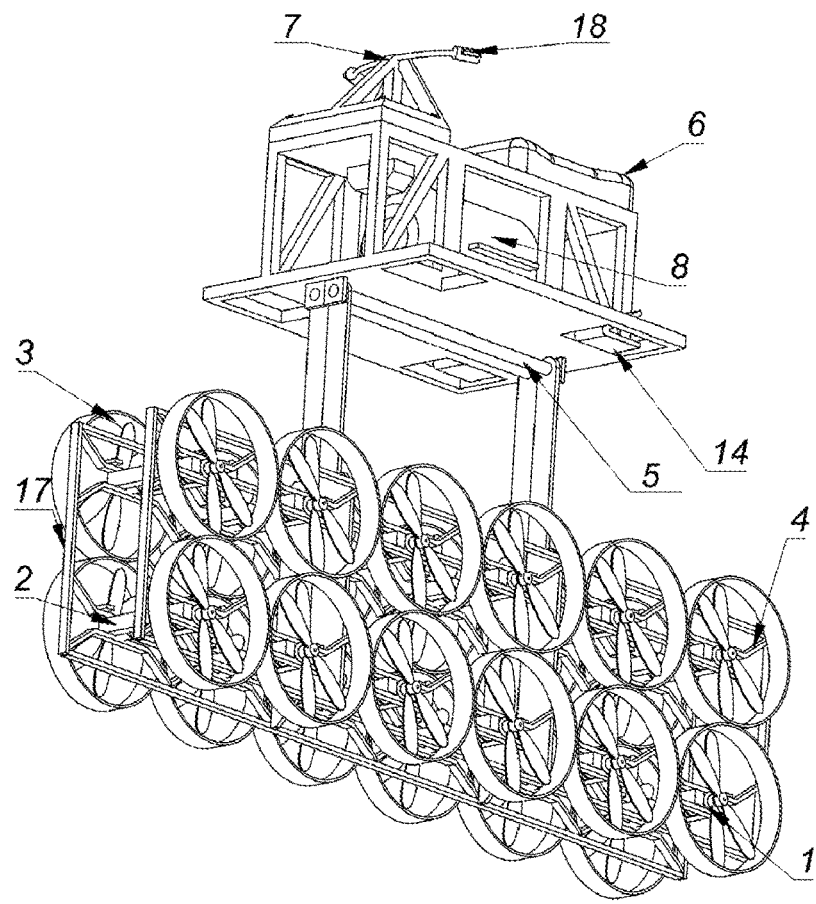
FIG. 30 depicts an airframe with two section folded down, all implemented in accordance to other non-limiting embodiments of the present technology.
Figure 31:
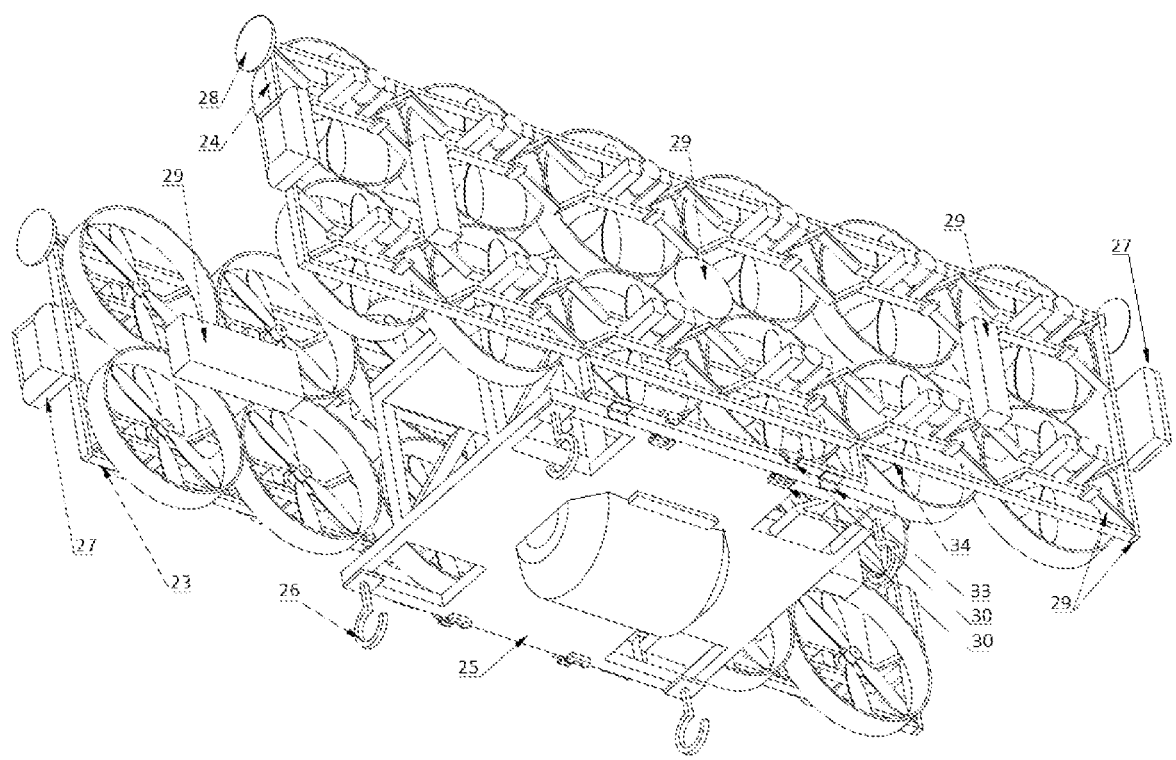
FIG. 31 depicts a folding mechanism and an arrangement of additional power sources and instrumentation, all implemented in accordance to non-limiting embodiments of the present technology.
Figure 32:
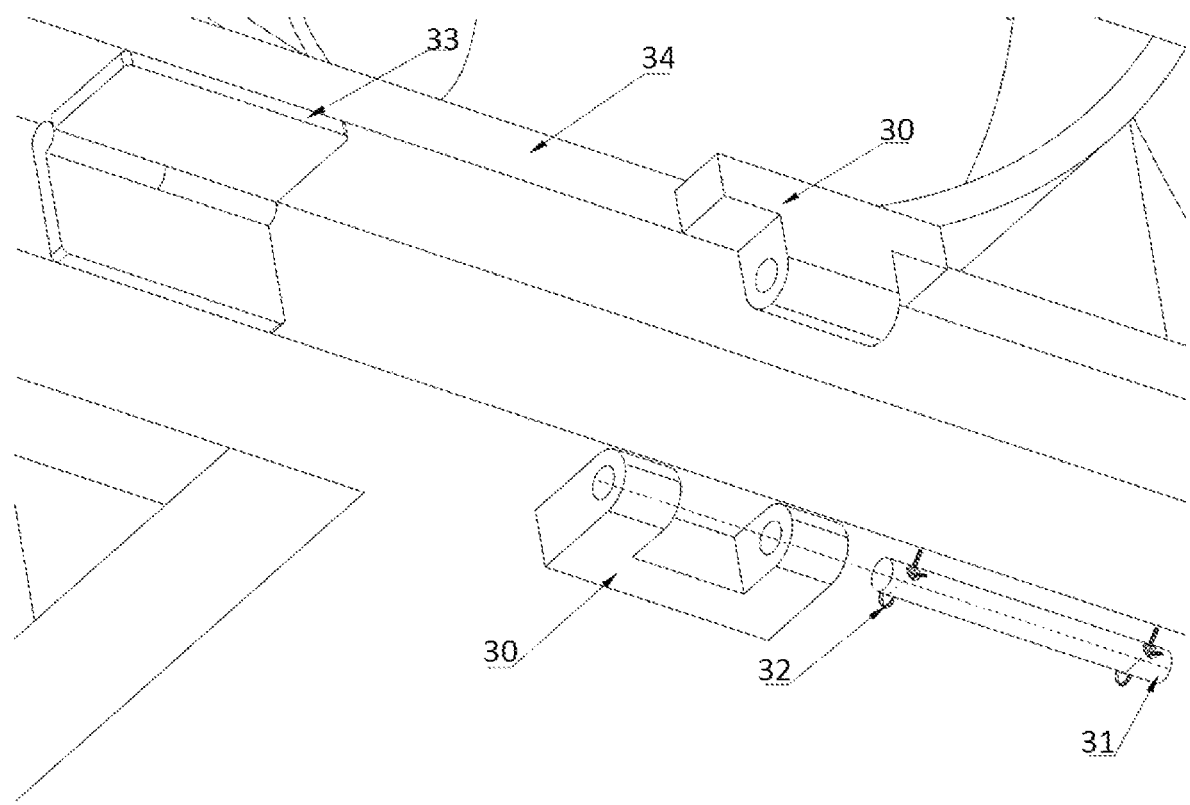
FIG. 32 depicts a folding mechanism (opened), all implemented in accordance to non-limiting embodiments of the present technology.
Figure 33:
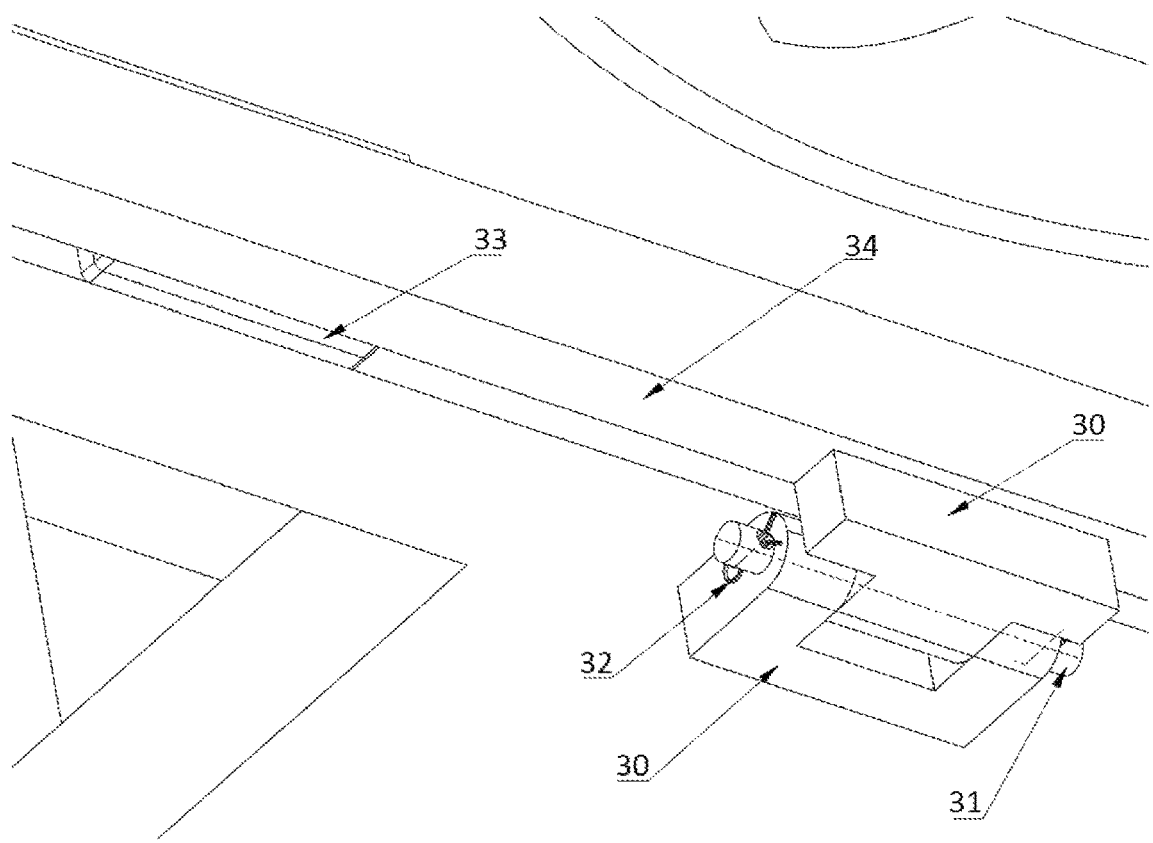
FIG. 33 depicts a folding mechanism (closed), all implemented in accordance to non-limiting embodiments of the present technology.
Figure 34:
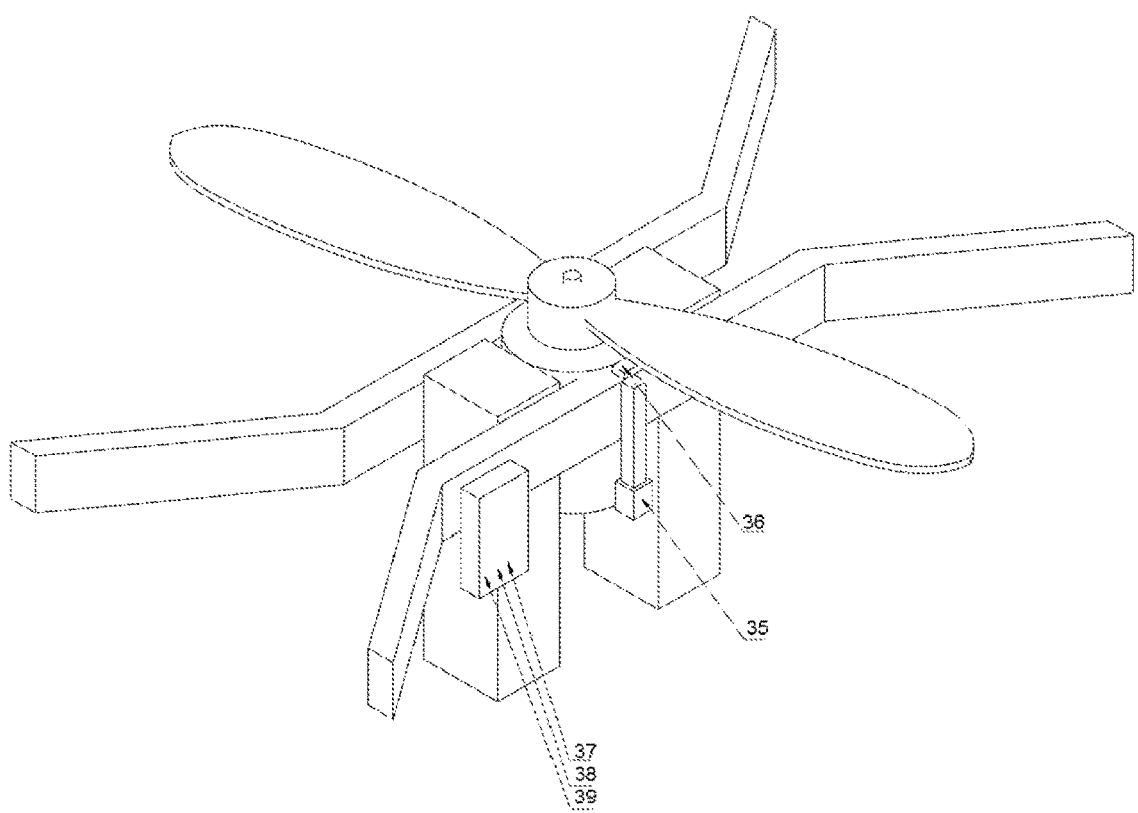
FIG. 34 depicts an arrangement of control sensor on the engine unit, all implemented in accordance to non-limiting embodiments of the present technology.

The shape and the order of the sections is chosen to minimize the unoccupied space between the engine units (3). In-line arrangement is acceptable, it means that all engine units are located in the same horizontal plane, symmetrically to each other. Chess-board order means that engine units are displaced in respect to each other in horizontal and/or vertical planes. In this case the engine units are arranged in two levels, as shown in FIG. 24, wherein the engine units in the upper level are installed in the unoccupied space between the engine units in the lower level, and this is a preferable embodiment as it provides more flexibility. The size of sections can also be limited with the size of aerodynamic shafts (15) with the inner diameter equal or exceeding the diameter of the propeller in the engine unit (3).

The aircraft comprises two sections, and each of the section includes, at least, three engine compartments, each of the engine compartments further housing an engine unit (3). The required number of the engine units (3) per one section is defined based on the required lifting capacity of the aircraft and the available thrust of one engine. The aggregate thrust value of all the engine units (in kilograms) should exceed the weight of the aircraft by, at least, 20%, including the weight of the pilot and the cargo to ensure better maneuvering capability and redundancy of the faulty engine units. The further increase of the thrust margin (by adding more engine units) improves the maneuvering capability of the aircraft, which improves its consumer performances.

The airframe sections are attached to the central section of the airframe by means of a folding mechanism, which, in a particular embodiment, comprises hinges and pin locks, which are used to get the section folded up or down and have them secured in their end positions. In one particular embodiment the folding mechanism is an extendable unit with sliders, moving along which the airframe sections go under the aircraft and can be retracted back to their operational position where they get latched with pin locks in their end positions.

The airframe of the aircraft (17) is made of light-weighted profile materials, such as carbon fabrics, composites, aluminum, duralumin, titanium; and represents a spatial structure, comprising elements with round-, rectangular-, and oval-shaped section, being attached to each other using welding, riveting or gluing together.

In one of the non-limiting embodiments of the present technology, welding is used for metal profiles, and gluing is used for carbon fabrics and composites.

The spatial design of the airframe and aerodynamic shafts (as one of embodiments), along with the propeller safety guards ensure required rigidity of the airframe and necessary protection for the pilot and the people around to keep them safe from the rotating propellers (10) or their breakage fragments.

Engine units (3) are installed using the support structures made of the same material as the airframe itself. The support structures are used for attachment of the engine units to the airframe using one of the above methods taking into account the material of the support structures and the airframe. Wiring, piping, sensors and other electronic hardware, steering system, and the cockpit with the pilot seat, power sources are also attached to the airframe. Inside the hollow elements of the airframe there are optical communication channels to monitor the airframe integrity, wiring and piping (where the extra protection of the conductors from mechanical impact is needed).

According to the embodiment 1, the engine unit comprises one or more electric engines arranged in-line, with horizontally rotating propellers. The engines are supplied from one power supply source or a group of power supply sources located directly on the engine support structures and located within an airstream produced the at least one horizontally rotatable propeller of this engine unit. Ancillary power supply sources located beyond the engine unit, may be used; they supply several engine units at once, all the engine units cannot be supplied from one power supply source. It is possible to install the ancillary power supply source inside the hollow airframe elements, in the unoccupied space between the propellers, above and under the engine units.

In one of the non-limiting embodiments of the present technology, installation of power supply source in the unoccupied space between the propellers of the section is used.

Each of the engine units comprises an individual engine controller, which receives the commands from the distributed control system via onboard information network. This controller is in charge of the operation of electric engines, it monitors the operational availability of the engine and power supply source, and checks the compliance with the selected engine and power supply source operational mode by means of electric current sensors, voltage sensors, temperature detectors, rpm sensors and vibration sensors.

The electric current sensors are located at the entry to the engine unit (as per electric diagram) and measure the current supplied from power supply source and consumed by the engine unit, and the electric current in the phase conductors of the engines, the measurement is carried out individually for each phase. The voltage sensors are located on the circuit board of the controller and connected to the sensing points of the engine unit: input voltage at power supply source, voltage on the engine, phase voltage, supply voltage of the controller electronic hardware. Rpm sensors are located near the electric engines, they measure the engine speed and rotation based on the changed magnetic field or beam deflection/breaking on the control surface of the engines during rotation (magnetic sensor is recommended). The temperature detectors are located on the controller circuit board and in the sensing points: on power supply sources, on engine winding, on the power keys. Vibration sensors are located at the points where the engines are attached to the airframe. In case rechargeable power supply sources are used, the engine controller also checks the process of charging the power supply source. Any engine unit is equipped with its own autopilot module. Therefore, each engine unit is an autonomous and independent functional module.

The aircraft cockpit and all the engine units are linked with a cable used for communicating control commands (main channel) to the engine units. This cable also serves for power supply source charging with low current, in case rechargeable power supply sources are used. It is possible to switch power supply from the neighboring engine units to a particular engine unit using this cable and a systems of switches located in each of the engine units. Connecting the charging unit directly to power supply source of the engine unit enables quick charging with high-ampere current.

Redundant control channel can be arranged either with another cable located in a different place (to avoid simultaneous damage to both cables) or via radio channel. The advantage of using a radio channel is avoiding the problem of additional weight of cables, and advantage of using a cable channel is better noise-immunity of the communication channel. Matrix type arrangement is used when placing the cables, it means one control channel includes cables laid transversely to the aircraft centerline, and for the second channel the cables are laid longitudinally to the aircraft centerline (modular structure of LH and RH airframe section makes this arrangement possible). In this case two cables are connected to each engine unit from different sides and the cable routes are also different without any overlapping. In case the radio channel is used, transmitters for signal transfer are installed in each engine unit and in the control system. For synchronization of signal transmission the anti-collision protocol based on the transmitter priority is used. The control system ranks as a top priority, down the hierarchy the priorities are allocated between the engine units from the top to the minimum priority. The top priority is assigned to those engine units which are located farther from the center of gravity, because their input to the control action is larger due to higher leverage to the center of gravity.

Any type of generators and turbogenerators, batteries, chemical current sources, fuel cells, radioisotope and nuclear fuel elements can be used as PSU. The said PSUs should be assembled and connected to the engine units in compliance with the manufacturer's manual.

In one of the non-limiting embodiments of the present technology, rechargeable chemical current sources (accumulators) are used.

According to the embodiment 2, the engine unit (3) comprises one or more pneumatic engines, arranged in-line, with horizontally rotatable propellers (10) attached and downward exhaust pipe.

Each pneumatic engine is supplied from a compressor (8), installed in the central section of the flying vehicle, through the piping and system of electrically driven valves, regulating the flow of compressed gas to the pneumatic engines and receiving signals from the distributed control system via the onboard information network. The compressor (8) is a combustion engine or a turbocharged unit with the air compression system, supplied with the fuel from the tank located above the compressor and attached to the compressor body. For temporary redundancy the compressor may comprise a pneumatic accumulator attached to the compressor body, designed for temporary power supply to engines, if the main compressor fails. Switching from the main compressor to the pneumatic accumulator is automatically initiated by means of a three-way valve which is installed on the pneumatic accumulator in the piping gap between the pneumatic accumulator and the compressor. The pneumatic accumulator is connected to the engine supply lines. The three-way valves are initiated upon detection of the pressure difference on the both sides (compressor side and pneumatic accumulator side), valves are switched to the source of higher pressure. Use of the pneumatic auxiliary power units of aircraft, such as engine AI-9, GTCP36, etc., in function of a compressor (8), is the most preferable.

The compressed air of the compressor (8) is delivered to the pneumatic engines via independent pipings, each pipe is connected to its own engine unit (3). The pipings are arranged inside or outside the airframe elements, wherein the internal arrangement improves protection of pipings, and the external arrangement improves cooling and maintainability.

In one of the non-limiting embodiments of the present technology, the external arrangement of piping is used. Control valves for each of pneumatic engines are located on both ends of the piping, wherein one of these two valves can be intermittent, configured to be used for shutting down the emergency pipe, and the second one will be a regulating one, installed individually for each pneumatic engine. Distributed control system (DCS), via the onboard information network, generates commands to the engine controller, which influences the regulator valve opening by changing the electric signals delivered to the valves via cable wiring, so regulating the gas flow in a particular channel, and therefore, the power capacity and thrust of this engine unit.

The controller, installed on the pneumatic engine, continuously monitors the operational condition of the pneumatic engine based on the readings from pressure sensors, rpm sensors, temperature and vibration sensors. The controller may, upon its own discretion, decide on switching off the emergency engine by initiation of shut-off valves which close the pneumatic engine supply lines. In this case a signal to the distributed control system (DCS) is generated by the controller. DCS may also generate a tripping command to the engine control unit (engine controller (9)) to stop the pneumatic engine. Rpm sensors are located near the electric engines, they measure the engine speed and rotation based on the changed magnetic field or beam deflection/breaking on the control surface of the engines during rotation (magnetic sensor is preferable). The temperature sensors are located on the controller circuit board and in the sensing points: on valves, on engine casings, and on the piping. The vibration sensors are located at the points where the engines are attached to the airframe. The pressure sensors are installed on the compressor board and connected to the sensing points on the piping, engine and valves. The sensors are used for measuring the pressure in relation to the atmospheric pressure and the pressure drop values between the sensing points.

In one of the non-limiting embodiments of the present technology, control cables and radio channels are used for transmission of commands to the controller and acquiring diagnostic information.

In one of the non-limiting embodiments of the present technology, a redundant compressor and pipings with independent (of the main valve) valves can be installed to recover damages which occurred during the flight, wherein the redundant compressor is placed inside the central section of the airframe instead of the pneumatic accumulator, near the main compressor. The redundant compressor should be installed to avoid distortion of the center of gravity of the flying vehicle. The routing of redundant pipings inside the section should not coincide with the routing of main pipings for the main compressor to avoid having them damaged simultaneously. In other words, matrix type arrangement is used when laying the pipings, it means one control channel includes pipings located transversely to the aircraft centerline, and for the second channel the pipings are placed longitudinally to the aircraft centerline (modular structure of LH and RH airframe section makes this arrangement possible). In this case two cables are connected to each engine unit from different sides and the cable routes are also different without any overlapping. Both of the compressors—the main one and the redundant one—have independent control systems, fuel supply systems and storage tanks.

Distributed control system is in charge of stabilization of angular and spatial positions of the aircraft, as well as for maintaining the selected flight level, by means of selectively changing the thrust generated by the section engine units, sending control commands to the engine controllers of each of the engine units. The distributed control system consists of independent autopilot boards connected to the onboard information network. An operability check of any individual autopilot board is conducted by other autopilot boards connected to the same network based on arbitration approach, by majority of decisions. Any individual autopilot board comprises three inertial type sensors (tree-axis gyroscope and three-axis accelerometer), one magnetic sensor (direction finder), a barometric altitude sensor and air speed sensor, which is designed as a differential pressure sensor with the air inlet of Pitot probe type, pyrometric horizon finders, a receiver unit for satellite navigation system, as well as optical, ultrasonic or radio altimeters (radio altimeter is preferable). Readings acquired by the sensors are recorded in the central processing unit of autopilot board where they pass through data fusion and correction processes using the Kalman filter, resulting in true values of the flying vehicle's orientation angles, as well as values of angular and linear speed and acceleration.

In one of the non-limiting embodiments of the present technology, based on these parameters autopilot, the central processing unit calculates the required value of thrust individually for each engine or solving the Navier—Stokes equations, wherein the engine units are represented as a vector field. This method provides the most accurate result for universal section size, but also requires maximum computational resources. Another method of thrust value calculation is vector decomposition of thrust produced by each engine unit to the center of gravity in three-dimensional space. This method requires floating-point trigonometric calculations, but, wherein, consumes less computational resources than solving Navier—Stokes equations. An alternative is using Hooke's law with diffusion, wherein each engine unit is represented as an inertial flexible element because it operates in elastic (air) medium, and the relationship between the neighboring engine units (thrust gradient) is described with an equation of diffusion to the neighboring engine units. The data resulting from this method is least accurate due to dependency on the elasticity of the medium which is determined by the flight altitude. However, the advantage of this method is that integer values are used during calculations, and the load to the engines located at different distance from the center of gravity, leveling engines wear, can be regulated flexibly via diffusion ratios. One more method is calculations in polar coordinates with matrix rotation, wherein each engine unit has its own polar coordinate in relation to aircraft center of symmetry, and the extent to which this coordinate influences the angular position of the aircraft is expressed via position vector of the polar system of coordinates in decomposition of the torque generated by the engine to longitudinal symmetry axis of the aircraft (this method in the simplest). In case the aircraft is operated in manual pilot mode, the control system simulates the standard patterns of operation for ground transport. This is enabled by the use of controls which are conventional for ground transport vehicles: steering wheel and handles, and/or pedals of accelerator/decelerator, for manual only mode or mixed foot- and hand-operation mode. This requires the pilot to use his 'driving' skills (used in operating ground vehicles such as motorbike or car), wherein the control system processes the signals from the controls and convert these signals into commands for the engine units. The flight altitude is set with an individual handle and is maintained automatically by the control system during the whole flight based on the indication of the sensors, such as a receiver of satellite navigation system, a barometric altitude sensor, an optical (for low altitudes) altimeter or a radio (for higher altitudes) altimeter, an ultrasonic range finder (for radar-transparent obstacles).

This makes it possible to apply the same patterns, as when driving a ground transport, to the aircraft enabling the user (vehicle operator) to learn 'driving' the aircraft easier because there is no need to acquire any 'piloting' skills. Wherein the steering block is configured to be removed from the flying vehicle, as the whole assembly, by disconnecting of quick-release twist draw latches and connector pin, connecting the steering block to the distributed control system via the wired network, and can be used as an individual remote control unit for operating the aircraft in unmanned and remotely piloted mode. This is enabled by equipping the steering block with an individual rechargeable power source and radio transmitter.

Therefore, a combination of features provided by the claimed aircraft can be implemented in accordance with FIG. 1-FIG. 30, and results in a compact-sized, mobile, environmentally-friendly, safe and convenient design of a multicopter vertical takeoff and landing (VTOL) aircraft with high maintainability, fail-safe and cost-effective. It can be used by emergency response services and medical rescue teams, for delivering mail as short-range transportation vehicle in rough terrains, for field geological exploration and military reconnaissance, for inspection and repair of power transmission lines enabling access to the object from any side; for transportation of landing troops, in warehouse logistics and security services, as emergency escape transport (both in unmanned and in remotely piloted mode); as a helicopter crane during erection of engineering and fortification structures, as travel and leisure means.

The invention claimed is:
1. A multicopter vertical takeoff and landing (VTOL) aircraft comprising:
    an airframe implemented with a spatial design,
    a distributed control system,
    the airframe including a central section and at least two peripheral sections,
        the central section and the at least two peripheral sections being implemented with the spatial design,
        each of the at least two peripheral sections including at least three interconnected standard engine compartments,
        each engine compartment housing an engine unit, the engine unit including at least one engine, at least one horizontally rotatable propeller, and a control hardware having been installed within the respective engine compartment;
            the control hardware comprising at least:
                an individual power supply source for powering on the at least one engine;
                an individual engine controller with an autopilot module, implemented as part of the distributed control system, configured to control the at least one engine of the respective engine compartment.

2. The VTOL aircraft according to claim 1, wherein the at least two peripheral sections comprise standard modules, each standard module being constructed of a plurality of parts, with at least some of the plurality of parts being interchangeable between any two different standard modules.

3. The VTOL aircraft according to claim 1, wherein the at least two peripheral sections are configured to be at least one of: folded upwards, folded downwards or be retracted under the VTOL aircraft when stored.

4. The VTOL aircraft according to claim 1, wherein the at least two peripheral sections are located in a space limited by structural elements of the airframe, without encompassing any of the structural elements of the airframe inside, the peripheral section including:
   at least two fastening points where the at least one engine unit is attached to the airframe, and wherein two neighboring sections have, at least, one fastening point in common between them.

5. The VTOL aircraft according to claim 1, wherein the engine compartments with engine units have an in-line arrangement, symmetrical to each other and are located in at least one horizontal plane.

6. The VTOL aircraft according to claim 1, wherein the engine compartments housing the engine units are arranged in a chess-board order, displaced to each other and located in at least one horizontal plane.

7. The VTOL aircraft according to claim 1, wherein the at least one engine being supplied with power, in use, from at least one power supply source located directly on the engine unit located within an airstream produced by the at least one horizontally rotatable propeller.

8. The VTOL aircraft according to claim 7, wherein the at least one power supply source of a given engine unit is configured to be selectively switched to supply power to another engine unit via a wired system of switches.

9. The VTOL aircraft according to claim 7, wherein the at least one power supply source comprises at least one of: a set of fuel cells, radioisotope and nuclear sources of electric power.

10. The VTOL aircraft according to claim 1, wherein the engine unit comprises, at least, two coaxially located electric engines.

11. The VTOL aircraft according to claim 1, wherein each of the engine units is implemented as an autonomous unit having:
   an electric engine
   an independent power supply source,
   an instrumentation set,
   engine control appliances,
   battery charging and control appliances,
   an autonomous autopilot module,
   the autonomous unit being integrated with other autonomous units as part of the VTOL aircraft functioning as one whole system of the flying vehicle.

12. The VTOL aircraft according to claim 1, wherein each engine unit comprises at least one pneumatic engine, wherein power supply of each one of the at least one pneumatic engine is supplied from the compressor installed in the central section of the airframe via individual piping with a valve system with electric drives, regulating the flow of the compressed gas supplied to the at least one pneumatic engines and their thrust in response to commands from the distributed control system.

13. The VTOL aircraft according to claim 12, wherein the at least one pneumatic engine comprises at least two coaxially arranged pneumatic engines.

14. The VTOL aircraft according to claim 12, wherein the individual pipings are located either inside or outside the airframe.

15. The VTOL aircraft according to claim 12, wherein each pneumatic engine unit is an autonomous unit with a separate channel of pneumatic energy transfer from the compressor and an instrumentation set operated in response to commands received from the distributed control system.

16. The VTOL aircraft according to claim 12, further comprising a redundant compressor and redundant pipings with autonomously operated valves, wherein the redundant compressor is installed inside the central section of the airframe.

17. The VTOL aircraft according to claim 1, wherein the central section comprises: a cockpit with a pilot seat and controls, control system, hand- and foot-operated controls, steering block and a compressor.

18. The VTOL aircraft according to claim 1, further comprising a removable steering block configured to be used as an individual remote control for operating the VTOL aircraft in an unmanned mode.

19. The VTOL aircraft according to claim 1, wherein each peripheral section of the at least two peripheral sections comprises a plurality of engine units that are controllable autonomously, the at least two peripheral sections being implemented with a total number of engine units, the total number having an equal number of engine units having propellers rotating clockwise and engine units having propellers rotating counterclockwise.

20. The aircraft according to claim 1, wherein each engine unit is controllable autonomously, wherein each peripheral section has a plurality of engine units, each having an even number of contra-rotating propellers.

* * * * *